United States Patent
Balasubramanian et al.

(10) Patent No.: US 11,576,126 B2
(45) Date of Patent: Feb. 7, 2023

(54) WAKEUP SIGNALING IDENTIFICATION

(71) Applicant: QUALCOMM Incorporated, San Diego, CA (US)

(72) Inventors: Anantharaman Balasubramanian, San Diego, CA (US); Sudhir Kumar Baghel, Hillsborough, NJ (US); Shuanshuan Wu, San Diego, CA (US); Kapil Gulati, Belle Mead, NJ (US); Wanshi Chen, San Diego, CA (US); Gabi Sarkis, San Diego, CA (US); Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 17/189,997

(22) Filed: Mar. 2, 2021

(65) Prior Publication Data

US 2021/0306949 A1    Sep. 30, 2021

Related U.S. Application Data

(60) Provisional application No. 62/994,234, filed on Mar. 24, 2020.

(51) Int. Cl.
H04W 52/02    (2009.01)

(52) U.S. Cl.
CPC .............................. H04W 52/0235 (2013.01)

(58) Field of Classification Search
CPC ............... H04W 4/40; H04W 52/0216; H04W 52/0229; H04W 52/0235; H04W 52/0264; H04W 52/028; Y02D 30/70

USPC ............................................................ 370/329
See application file for complete search history.

(56) References Cited

U.S. PATENT DOCUMENTS

| | | | |
|---|---|---|---|
| 2017/0245319 A1 | 8/2017 | Yasukawa et al. | |
| 2018/0084499 A1* | 3/2018 | Qi | H04W 52/0235 |
| 2018/0352512 A1* | 12/2018 | Kim | H04L 67/12 |
| 2018/0376419 A1* | 12/2018 | Li | H04W 52/0222 |
| 2020/0053647 A1 | 2/2020 | Chae et al. | |

(Continued)

OTHER PUBLICATIONS

Huawei, et al., "On Support for UE-Group Wake-Up Signal", 3GPP Draft, 3GPP TSG RAN WG1 Meeting #94, R1-1808107, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051515509, 4 pages, Retrieved from the Internet: URL: http://www.3gpp.org/ftp/tsg%5Fran/WG1%5FRL1/TSGR1%5F94/Docs/R1%2D1808107%2Ezip [retrieved on Aug. 11, 2018], Annex A, paragraphs [03.1]-[03.3].

(Continued)

Primary Examiner — Robert J Lopata
(74) Attorney, Agent, or Firm — Holland & Hart LLP

(57) ABSTRACT

Methods, systems, and devices for wireless communications are described. A user equipment (UE) may receive a signal indicating a wakeup opportunity associated with receiving one or more messages from an application and may identify a mapping between an attribute of the signal and an identifier associated with the application. The UE may determine a wakeup procedure in response to receiving the signal based on the mapping between the attribute of the signal and the identifier associated with the application.

29 Claims, 14 Drawing Sheets

(56) References Cited

U.S. PATENT DOCUMENTS

| | | | | |
|---|---|---|---|---|
| 2020/0089306 | A1* | 3/2020 | Oh | H04W 52/0245 |
| 2020/0107267 | A1* | 4/2020 | Wu | H04W 52/0219 |
| 2020/0178172 | A1* | 6/2020 | Thangarasa | H04W 52/0216 |
| 2020/0178177 | A1* | 6/2020 | Kim | H04W 80/02 |
| 2020/0187121 | A1* | 6/2020 | Abbasi | H04W 52/0258 |
| 2020/0245246 | A1* | 7/2020 | Dhanda | H04W 52/0219 |
| 2020/0374780 | A1* | 11/2020 | Shan | H04W 48/10 |
| 2021/0021672 | A1* | 1/2021 | Shivarajapura | H04L 5/0037 |
| 2021/0037461 | A1* | 2/2021 | Fryking | H04L 61/2514 |
| 2021/0105718 | A1* | 4/2021 | Liu | H04W 52/0229 |
| 2021/0185495 | A1* | 6/2021 | Shin | H04W 52/0251 |
| 2021/0289268 | A1* | 9/2021 | Ng | H04N 21/235 |
| 2021/0337476 | A1* | 10/2021 | Shan | H04W 52/0229 |
| 2022/0104125 | A1* | 3/2022 | Liu | H04W 52/028 |

OTHER PUBLICATIONS

International Search Report and Written Opinion—PCT/US2021/020744—ISA/EPO—dated Jun. 29, 2021.

QUALCOMM Incorporated: "Feature Lead Summary of 6.2.1.1 Maintenance for UE Group MWUS", 3GPP Draft, 3GPP TSG-RAN WG1 #100, R1-2000815, 3rd Generation Partnership Project (3GPP), Mobile Competence Centre, 650, Route Des Lucioles, F-06921, Sophia-Antipolis Cedex, France, vol. RAN WG1, No. e-Meeting, Feb. 24, 2020-Mar. 6, 2020, Feb. 17, 2020 (Feb. 17, 2020), XP051853628, 6 pages, Retrieved from the Internet: URL: https://ftp.3gpp.org/tsg_ran/WG1_RL1/TSGR1_100_e/Docs/R1-2000815.zip R-2000815 FLsummary of 6.2.1.1 group MWUS.docx [retrieved on Feb. 17, 2020] paragraph [02.7].

* cited by examiner

WAKEUP SIGNALING IDENTIFICATION

CROSS REFERENCE

The present Application for Patent claims the benefit of U.S. Provisional Patent Application No. 62/994,234 by BALASUBRAIVIANIAN et al., entitled "WAKEUP SIGNALING IDENTIFICATION," filed Mar. 24, 2020, assigned to the assignee hereof, and expressly incorporated by reference herein.

FIELD OF TECHNOLOGY

The following relates generally to wireless communications and more specifically to wakeup signaling identification.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may receive wakeup signaling and may perform a wakeup procedure for each received wakeup signal. Conventional methods for performing a wakeup procedure may be improved.

SUMMARY

The described techniques relate to improved methods, systems, devices, and apparatuses that support wakeup signaling identification. Generally, the described techniques support the identification of an application that is associated with received signaling (e.g., wakeup signaling, etc.) such that a user equipment (UE) may determine whether to perform a wakeup procedure in response to the signaling or remain in an idle or sleep state. Such techniques may provide power savings for a UE, because the UE may perform a wakeup procedure for some applications of interest (e.g., safety applications), while not performing a wakeup procedure for other applications. In some cases, a UE may receive a signal (e.g., a sidelink wakeup signal (SWUS)) indicating a wakeup opportunity associated with receiving one or more messages from an application, and identify a mapping between an attribute of the signal and an identifier associated with the application. In some cases, the attribute may include a sequence (e.g., a sequence specific to an application or a subset of applications), or a cyclic shift (e.g., a cyclic shift specific to an application or a subset of applications), or some other attribute of the wakeup signaling. The UE may determine a wakeup procedure in response to receiving the signal based on the mapping. In some examples, the UE may determine that the received signal is associated with an application of interest to the UE based on the mapping and may perform a wakeup procedure. If the UE determines that the received signal is not associated with an application of interest, then the UE may determine not to perform a wakeup procedure.

A method of wireless communications at a UE is described. The method may include receiving a signal indicating a wakeup opportunity associated with receiving one or more messages from an application, identifying a mapping between an attribute of the signal and an identifier associated with the application, and determining a wakeup procedure in response to receiving the signal based on the mapping.

An apparatus for wireless communications at a UE is described. The apparatus may include a processor, memory coupled with the processor, and instructions stored in the memory. The instructions may be executable by the processor to cause the apparatus to receive a signal indicating a wakeup opportunity associated with receiving one or more messages from an application, identify a mapping between an attribute of the signal and an identifier associated with the application, and determine a wakeup procedure in response to receiving the signal based on the mapping.

Another apparatus for wireless communications at a UE is described. The apparatus may include means for receiving a signal indicating a wakeup opportunity associated with receiving one or more messages from an application, identifying a mapping between an attribute of the signal and an identifier associated with the application, and determining a wakeup procedure in response to receiving the signal based on the mapping.

A non-transitory computer-readable medium storing code for wireless communications at a UE is described. The code may include instructions executable by a processor to receive a signal indicating a wakeup opportunity associated with receiving one or more messages from an application, identify a mapping between an attribute of the signal and an identifier associated with the application, and determine a wakeup procedure in response to receiving the signal based on the mapping.

Some examples of the method, apparatuses, and non-transitory computer-readable medium described herein may further include operations, features, means, or instructions for determining a reference time period associated with receiving the signal and a periodicity associated with receiving the signal based on the attribute of the signal.

In some examples of the method, apparatuses, and non-transitory computer-readable medium described herein, the attribute of the signal includes a sequence.

In some examples of the method, apparatuses, and non-transitory computer-readable medium described herein, the mapping includes a mapping between a set of sequences and a set of identifiers associated with a set of applications.

In some examples of the method, apparatuses, and non-transitory computer-readable medium described herein, the mapping may be based on a modulo function of a number of the set of sequences and an identifier of the set of identifiers associated with the set of applications.

In some examples of the method, apparatuses, and non-transitory computer-readable medium described herein, the attribute of the signal includes a cyclic shift.

In some examples of the method, apparatuses, and non-transitory computer-readable medium described herein, the mapping includes a mapping between a set of cyclic shifts of a single sequence and a set of identifiers associated with a set of applications.

In some examples of the method, apparatuses, and non-transitory computer-readable medium described herein, the mapping may be based on a modulo function of a number of the set of cyclic shifts of the single sequence and an identifier of the set of identifiers associated with the set of applications.

Some examples of the method, apparatuses, and non-transitory computer-readable medium described herein may further include operations, features, means, or instructions for receiving configuration signaling indicating the attribute of the signal used for the mapping.

In some examples of the method, apparatuses, and non-transitory computer-readable medium described herein, the mapping may be based on a mapping at a vehicle to everything (V2X) protocol stack layer.

In some examples of the method, apparatuses, and non-transitory computer-readable medium described herein, the mapping may be based on a mapping at a radio resource control (RRC) protocol stack layer.

In some examples of the method, apparatuses, and non-transitory computer-readable medium described herein, the signal includes a SWUS.

In some examples of the method, apparatuses, and non-transitory computer-readable medium described herein, the identifier associated with the application includes a provider service identifier (PSID) that may be mapped to one or more application specific identifiers.

In some examples of the method, apparatuses, and non-transitory computer-readable medium described herein, the PSID may be mapped to an application identifier of the application.

Some examples of the method, apparatuses, and non-transitory computer-readable medium described herein may further include operations, features, means, or instructions for identifying a monitoring duration configured for monitoring for the one or more messages based on a mapping between the attribute of the signal and a set of monitoring durations.

In some examples of the method, apparatuses, and non-transitory computer-readable medium described herein, the monitoring duration includes a number of slots.

In some examples of the method, apparatuses, and non-transitory computer-readable medium described herein, the wakeup procedure includes turning on circuitry for monitoring for the one or more messages.

In some examples of the method, apparatuses, and non-transitory computer-readable medium described herein, the wakeup procedure includes skipping the wakeup opportunity.

A method of wireless communications at a UE is described. The method may include receiving a signal indicating a wakeup opportunity associated with receiving one or more messages from an application, identifying a monitoring duration for monitoring for the one or more messages based on a mapping between an attribute of the signal and a set of monitoring durations, and monitoring for the one or more messages based on the monitoring duration.

An apparatus for wireless communications at a UE is described. The apparatus may include a processor, memory coupled with the processor, and instructions stored in the memory. The instructions may be executable by the processor to cause the apparatus to receive a signal indicating a wakeup opportunity associated with receiving one or more messages from an application, identify a monitoring duration for monitoring for the one or more messages based on a mapping between an attribute of the signal and a set of monitoring durations, and monitor for the one or more messages based on the monitoring duration.

Another apparatus for wireless communications at a UE is described. The apparatus may include means for receiving a signal indicating a wakeup opportunity associated with receiving one or more messages from an application, identifying a monitoring duration for monitoring for the one or more messages based on a mapping between an attribute of the signal and a set of monitoring durations, and monitoring for the one or more messages based on the monitoring duration.

A non-transitory computer-readable medium storing code for wireless communications at a UE is described. The code may include instructions executable by a processor to receive a signal indicating a wakeup opportunity associated with receiving one or more messages from an application, identify a monitoring duration for monitoring for the one or more messages based on a mapping between an attribute of the signal and a set of monitoring durations, and monitor for the one or more messages based on the monitoring duration.

In some examples of the method, apparatuses, and non-transitory computer-readable medium described herein, the monitoring duration includes a number of slots.

In some examples of the method, apparatuses, and non-transitory computer-readable medium described herein, the mapping between the attribute of the signal and the set of monitoring durations includes a one-to-one mapping between sequences of the signal and the set of monitoring durations.

In some examples of the method, apparatuses, and non-transitory computer-readable medium described herein, the mapping between the attribute of the signal and the set of monitoring durations includes a one-to-many mapping between sequences of the signal and the set of monitoring durations.

DETAILED DESCRIPTION

Figure 1:
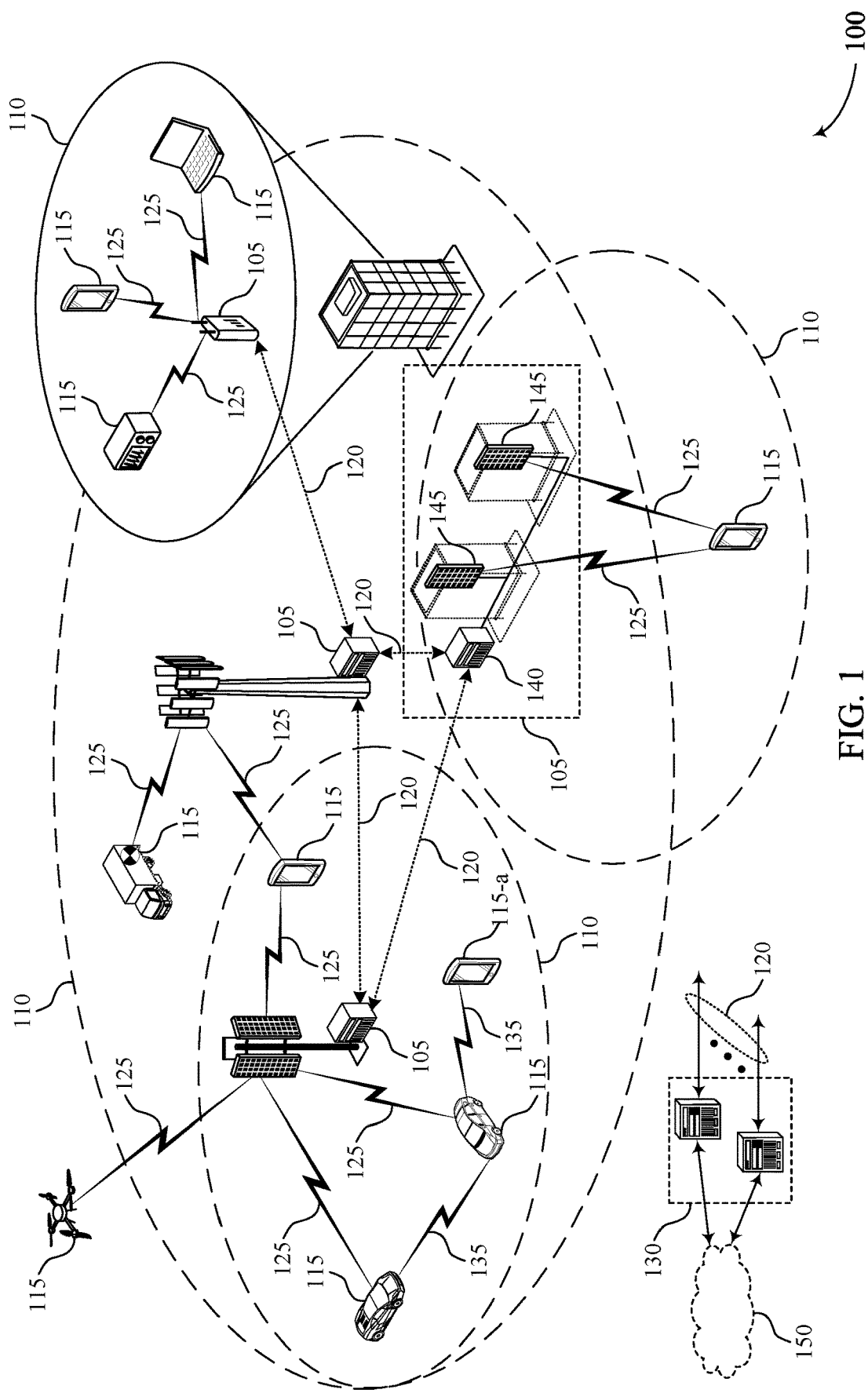
FIG. 1 illustrates an example of a system for wireless communications that supports wakeup signaling identification in accordance with aspects of the present disclosure.

Some wireless communications systems (e.g., vehicle-to-pedestrian (V2P), pedestrian-to-vehicle (P2V)) may be used to increase the safety of a pedestrian. In some cases, a vehicle user equipment (UE) (e.g., a UE that is on board or otherwise associated with a vehicle) may transmit a paging indication to a pedestrian UE (e.g., a UE carried by or otherwise associated with a pedestrian) for one or more applications such as a safety application, or global positioning system (GPS) application, etc. For example, when a pedestrian UE is in or headed toward an unsafe position (e.g., moving toward or currently in a collision course with one or more other vehicle UEs) a vehicle UE may transmit a paging indication to the pedestrian UE to alert the pedestrian. In some cases, a pedestrian UE may be configured to perform a wakeup procedure in response to each paging indication (e.g., wakeup signal) the pedestrian UE receives, and a pedestrian UE may not be able to determine which application the received wakeup signal is associated with until after the pedestrian UE wakes up and begins decoding messages. In some systems, the pedestrian UE may be configured to wakeup upon the reception of each wakeup signal, even if the pedestrian UE is not interested in the application associated with a given wakeup signal. This paging procedure may lead to an inefficient use of resources and may place a power burden on a pedestrian UE.

To mitigate the power consumption of a UE (e.g., a pedestrian UE), a wireless communications system that supports sidelink communications (e.g., communications between a vehicle UE and pedestrian UE) may be configured to support mapping between identifiers of an application (e.g., application-specific identifiers, provider service identifiers (PSID), etc.) and attributes of wakeup signals (e.g., sequence identifiers, cyclic shifts, etc.) such that a UE may identify an application based on an attribute of the wakeup signal and determine whether to perform a wakeup procedure based on the identification of the application. In some cases, more than one wakeup signal sequence (e.g., sidelink wakeup signal (SWUS) sequence) may be preconfigured such that each wakeup signal sequence may be mapped to a different application ID. Additionally or alternatively, multiple applications of interest to the pedestrian UE may be grouped into one or more identifiers, such as a PSID, that may then be mapped to a wakeup signal sequence. Additionally or alternatively, the pedestrian UE may be preconfigured with one wakeup signal sequence, where different cyclic shifts of that sequence may be mapped to a PSID or another application specific ID.

In some cases, an attribute of a wakeup signal may indicate a duration (e.g., in slots) of an opportunity for receiving messages from a UE associated with the wakeup signal. Such a duration may be referred to as an ON duration.

In accordance with aspects of the present disclosure, a UE may use the mapping between application identifiers and attributes of wakeup signaling to determine which wakeup signals to wake up for based on the applications of interest to the UE. A UE may perform a wakeup procedure for the wakeup signals associated with the applications of interest to the UE, but may remain in an idle or sleep state (e.g., not perform a wakeup procedure or skip a wakeup opportunity) for wakeup signals associated with applications not of interest to the UE. As such, a UE may conserve power by reducing the frequency the pedestrian UE wakes up in response to wakeup signaling.

Particular aspects of the subject matter described herein may be implemented to realize one or more advantages. The described techniques may support improvements in a UE wakeup procedure by decreasing unnecessary wakeup occurrences, and mitigating power consumption at the UE, among other advantages. As such, supported techniques may include improved network operations and, in some examples, may promote network efficiencies, among other benefits.

Aspects of the disclosure are initially described in the context of wireless communications systems. Aspects are then described with respect to protocol stack layers, a resource configuration, and process flows. Aspects of the disclosure are further illustrated by and described with reference to apparatus diagrams, system diagrams, and flowcharts that relate to wakeup signaling identification.

FIG. 1 illustrates an example of a wireless communications system 100 that supports wakeup signaling identification in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both. In some cases, V2X communications may include V2P and P2V communications that support communications between a vehicle UE 115 and a pedestrian UE (e.g., pedestrian UE 115-a. A vehicle UE 115 and pedestrian UE 115-a may communicate over sidelink 135.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

To mitigate the power consumption of a UE 115 (e.g., a UE 115-a), the wireless communications system 100 may support sidelink communications (e.g., over communication link 135) between a vehicle UE 115 and pedestrian UE 115-a that support mapping between an application ID and a wakeup signal attribute. In some cases, and attribute of a wakeup signal (e.g., a SWUS) may be mapped to an application ID. In some cases, the attribute may include a sequence of the wakeup signal such that each application or a subset of applications may be mapped to a unique wakeup signal sequence. Additionally or alternatively, the attribute may include a cyclic shift such that each application ID or a subset of application IDs are mapped to a different cyclic shift of the same wakeup signal sequence. The pedestrian UE 115-a may use the preconfigured mapping and may determine which wakeup signals the UE 115-a may wake up for based on the applications of interest to the pedestrian UE 115-a. The pedestrian UE 115-a may monitor for all wakeup signals, and perform a wakeup procedure for the wakeup signals associated with the applications of interest to the UE 115-a. In some cases, each wakeup signal sequence may indicate an ON duration that may be used by the pedestrian UE 115-a to monitor for transmissions from the vehicle UE 115 and to decode the received transmissions. As such, the pedestrian UE 115-a may conserve power by mitigating how frequently the pedestrian UE 115-a wakes up.

Figure 2:
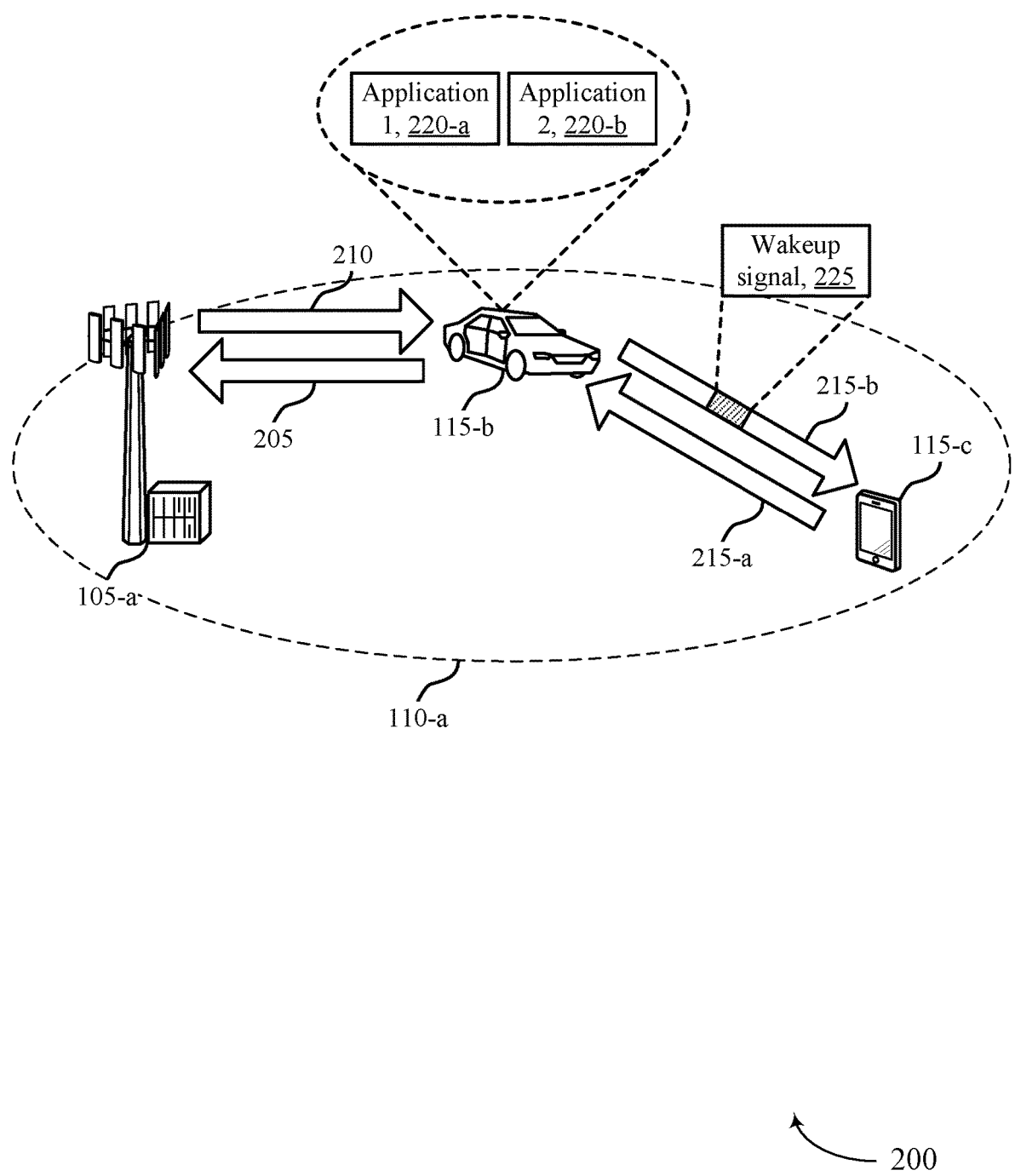
FIG. 2 illustrates an example of a system for wireless communications that supports wakeup signaling identification in accordance with aspects of the present disclosure.

FIG. 2 illustrates an example of a wireless communications system 200 that supports wakeup signaling identification in accordance with aspects of the present disclosure. The wireless communications system 200 may include base station 105-a and UE 115-b, and UE 115-c, which may be examples of a base station 105 and UEs 115 as described with reference to FIG. 1. UE 115-b may be referred to as a vehicle UE, and UE 115-c may be referred to as a pedestrian UE. Base station 105-a may serve a geographic coverage area 110-a. In some cases, pedestrian UE 115-c may implement a wakeup determination procedure. For example, pedestrian UE 115-c may determine whether to perform a wakeup procedure based on an attribute of a received wakeup signal and preconfigured mapping between attributes of the wakeup signal and applications supported by the UE 115-c. Additionally or alternatively, other wireless devices, such as base station 105-a and vehicle UE 115-b, or some combination of these devices, may implement a wakeup determination procedure.

In some wireless communications systems, base station 105-a and vehicle UE 115-b may communicate. For example, base station 105-a may transmit signals to vehicle UE 115-b via downlink 210, and vehicle UE 115-b may transmit signals to base station 105-a via uplink 205. In some wireless communication systems (e.g., V2X, V2P, P2V, D2D), vehicle UE 115-b and pedestrian UE 115-c may communicate via sidelink channels. For example, vehicle UE 115-b may transmit signals to pedestrian UE 115-c via sidelink 215-b and pedestrian UE 115-c may transmit signals to vehicle UE 115-b via sidelink 215-a. In some cases, base station 105-a may configure vehicle UE 115-b and pedestrian UE 115-c. In some cases, vehicle UE 115-b may relay messages between base station 105-a and pedestrian UE 115-c. In some cases, pedestrian UE 115-c may directly communicate with base station 105-a.

In some examples, vehicle UE 115-*b* may be configured to transmit signals (e.g., paging messages, wakeup signals, etc.) to pedestrian UE 115-*c* that are associated with applications 220. In some cases, the applications 220 may include a safety application, GPS application, emergency notification applications (e.g., flash flood, Amber alert), etc. To conserve power, the pedestrian UE 115-*c* may enter a lower power state (e.g., an OFF, semi-OFF, idle, sleep or any other state where one or more circuitry of the UE are powered off) until pedestrian UE 115-*c* receives a wakeup signal 225 from vehicle UE 115-*b* over sidelink 215-*b*. In some wireless communications systems, vehicle UE 115-*b* may transmit the same wakeup signal 225 to pedestrian UE 115-*c* for each application 220, and the pedestrian UE 115-*c* may be configured to wake up in response to each wakeup signal 225. As such, pedestrian UE 115-*c* may perform a wakeup procedure for each received wakeup signal 225 without knowing which application 220 the wakeup signal 225 is associated with. In some cases, a pedestrian UE 115-*c* that performs a wakeup procedure for each received wakeup signal 225 may have high power consumption or otherwise result in inefficient power usage. To mitigate the power consumption of the pedestrian UE 115-*c*, a pedestrian UE 115-*c* may be configured to perform a wakeup procedure for a subset of applications 220, such as the applications that are of interest to pedestrian UE 115-*c*. As such, wakeup signals 225 may be configured to a have a unique or identifiable attribute such that pedestrian UE 115-*c* may determine if the received wakeup signal 225 is associated with an application 220 of interest to pedestrian UE 115-*c*.

Pedestrian UE 115-*c* and vehicle UE 115-*b* may be configured with a mapping between an attribute of a wakeup signal 225 and the application 220 the wakeup signal 225 is associated with. In some cases, base station 105-*a* may determine the mapping and indicate the mapping to vehicle UE 115-*b*, or pedestrian UE 115-*c*, or a combination thereof. In some cases, vehicle UE 115-*b* may indicate the mapping to UE 115-*c*. In some cases, vehicle UE 115-*b* and pedestrian UE 115-*c* may be preconfigured with the mapping.

Each application 220 may be associated with a unique application ID. In some cases, each application ID may be mapped to a SWUS sequence (e.g., via an index or some other sequence identifier). In some cases, each application ID may be mapped to another ID, such as a PSID or wakeup signal identifier (WUSID), and each PSID (or WUSID) may be mapped to a SWUS sequence. A WUSID may be a lower layer identifier and may not be an application specific identifier, and a PSID may be an application specific identifier. In some examples, a subset of applications may be mapped with the same ID. For example, a subset of applications may be mapped with the same PSID or the same WUSID, or a combination thereof, and the PSID (or WUSID) may be mapped to a SWUS sequence. As such, some number of SWUS sequences may be configured (e.g., N SWUS sequences). The SWUS sequences that the pedestrian UE 115-*c* should wakeup for may be determined by the pedestrian UE 115-*c* based on a function. In some cases, the function may be a modulo function of the number of SWUS sequences (e.g., N SWUS sequences) and an identifier (e.g., PSID, WUSID). For example, if the SWUS sequences are mapped to PSIDs, the function may be PSID mod N, where PSID is the PSID sequence associated with an application, or applications of interest, and N is the number of configured SWUS sequences. In another example, if the SWUS sequences are mapped to WUSIDs, the function may be WUSID mod N, where WUSID is the WUSID sequence associated with an application, or applications of interest, and N is the number of configured SWUS sequences.

For example, pedestrian UE 115-*c* may be interested in multiple applications 220. Each application 220 may be mapped to a WUSID, such as WUSID1 and WUSID2.

Pedestrian UE 115-*c* may determine based on the functions, WUSID1 mod N and WUSID2 mod N, the SWUS sequences pedestrian UE 115-*c* should wake up for. Upon reception of a SWUS sequence, pedestrian UE 115-*c* may partially wakeup to receive and decode the wakeup signal 225. Pedestrian UE 115-*c* may autonomously determine whether to perform a wakeup procedure (e.g., fully wake up) based on the previous determination of SWUS sequences that pedestrian UE 115-*c* should wake up for. If the received SWUS sequence matches a SWUS sequence from the previous determination, then pedestrian UE 115-*c* may perform a wakeup procedure and fully wakeup. If the received SWUS sequence does not match a SWUS sequence from the previous determination, then pedestrian UE 115-*c* may not perform a wakeup procedure. Not performing a wakeup procedure may include skipping an opportunity for waking up and may include remaining in an idle, low power, sleep, or similar power state.

In some examples, pedestrian UE 115-*c* may be able to determine when and how frequently a SWUS sequence associated with an application or applications of interest will be received. As such, an identifier (e.g., PSID, WUSID) may implicitly map to a reference point, such as a starting slot, subframe, symbol, etc. for a wakeup signal 225. Additionally or alternatively, the identifier may map to periodicity associated with a wakeup signal 225. For example, each wakeup signal 225 associated with an application or set of applications may be assigned an initial starting slot and a transmission periodicity. The identifier associated with each application may map the starting slot and periodicity for each wakeup signal 225. For the pedestrian UE 115-*c* to be able to determine when and how frequently the SWUS sequences associated with an application of interest will be received, a number, B, may be defined for the number of possible tuples including start slot time, and periodicity for different SWUS sequences. The reference slot (e.g., start slot) and periodicity associated with a certain PSID may be given by PSID mod B. Pedestrian UE 115-*c* may determine one or more PSIDs that are associated with an application or applications of interest and input the PSID into the modulo function to determine the reference slot and periodicity associated with each PSID. Pedestrian UE 115-*c* may then monitor according to the reference slot and periodicity for the SWUS sequence.

In some cases, pedestrian UE 115-*c* and vehicle UE 115-*b* may be configured with a single SWUS sequence and the cyclic shift of that sequence may be mapped to one or more PSIDs (or other application IDs). For example, each application may be assigned a PSID, and each PSID may be assigned a cyclic shift that may be applied to the wakeup signal sequence. Pedestrian UE 115-*c* may determine that the one or more PSIDs that are associated with the application or applications of interest to pedestrian UE 115-*c* and determine the cyclic shift associated with each determined PSIDs. Upon reception of each wakeup signal sequence, if the determined cyclic shift and the received cyclic shift of the SWUS sequence match, then pedestrian UE 115-*c* may determine that pedestrian UE 115-*c* should wake up. In some cases, the preconfigured SWUS sequence, $\{x[n]\}$, may be of length, L and pedestrian UE 115-*c* may be configured with a number, M, of possible cyclic shifts that are possible for determining different SWUS sequences for the single SWUS sequence. The specific cyclic shift, d, to be used by pedestrian UE 115-c may be determined by the function, PSID mod M. Pedestrian UE 115-c may then determine the SWUS sequence shifted based on the cyclic shift by the function, {x[(n−d) mod L]}.

Figure 3:
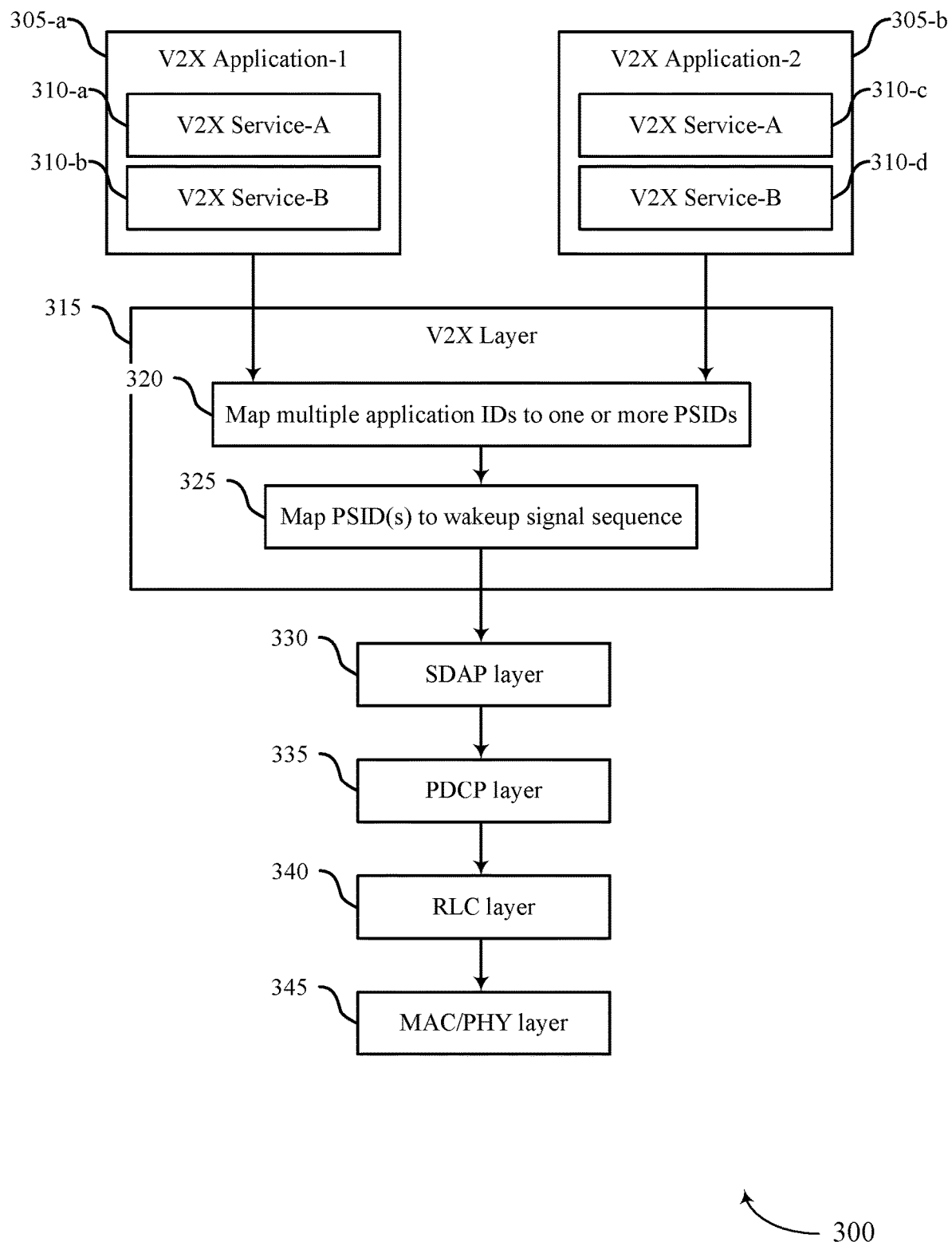
FIGS. 3 and 4 illustrate examples of protocol stack layers that support wakeup signaling identification in accordance with aspects of the present disclosure.

FIG. 3 illustrates an example of protocol stack layers 300 that support wakeup signaling identification in accordance with aspects of the present disclosure. The protocol stack layers 300 may implemented by a base station 105, or UEs 115, which may be examples of a base station 105 and UEs 115 as described with reference to FIGS. 1 and 2. UEs may include vehicle UEs, and pedestrian UEs. In some cases, a pedestrian UE may implement a wakeup determination procedure. For example, a pedestrian UE may determine whether to perform a wakeup procedure based on an attribute of a received wakeup signal and preconfigured mapping between attributes and applications, where the mapping may be configured in the V2X layer. Additionally or alternatively, other wireless devices, such as a base station and vehicle UE, or some combination of these devices, may implement a wakeup determination procedure.

As described herein, a device, such as a vehicle UE or pedestrian UE, may be configured to support multiple applications. In some cases, applications may be specific to the communications between the pedestrian UE and vehicle UE, such as in a V2X, V2P, P2V, etc. supported networks. For example, a vehicle UE and pedestrian UE may be configured to support application-1 305-a and application-2 305-b. Application-1 305-a and application-2 305-b may each be applications relating to safety, or each application may be unrelated. Application-1 305-a, or application-2 305-b, or both may be applications of interest to a pedestrian UE 115 as described herein.

In some examples, each application may be associated with one or more services. In some cases, each application may include various services 310 that support functionality of the applications, where a service 310 may be some function the application may perform. In some cases, a service 310 may be a category an application supports such as road safety, where more than one application may support a service 310. For example, application-1 305-a may be associated with V2X service-A 310-a and V2X service-B 310-b, and application-2 305-b may be associated with V2X service-A 310-c and V2X service-B 310-d, where the services 310 may be a function or a category supported by the application.

In some cases, each application may provide requirements associated with monitoring for paging messages to the V2X layer 315. The V2X layer 315 may assign one or more identifiers (e.g., PSIDs, WUSIDs) based on the applications request to monitor for sidelink paging messages. The identifiers may be mapped to a sidelink wakeup sequence using one of the methods described with reference to FIG. 2. For example, within the V2X layer 315, each application ID may be mapped to a PSID or WUSID at 320, or multiple application IDs may be mapped to a single PSID or WUSID. The PSIDs or WUSIDs may then be mapped to a wakeup signal sequence at 325. The mapping configured in the V2X layer 315 may be communicated to lower layers such as service data adaption protocol (SDAP) layer 330, PDCP layer 335, RLC layer 340, and MAC/PHY layer 345. As such, each layer in the protocol stack layers 300 may support the mapping configured in V2X layer 315.

Figure 4:
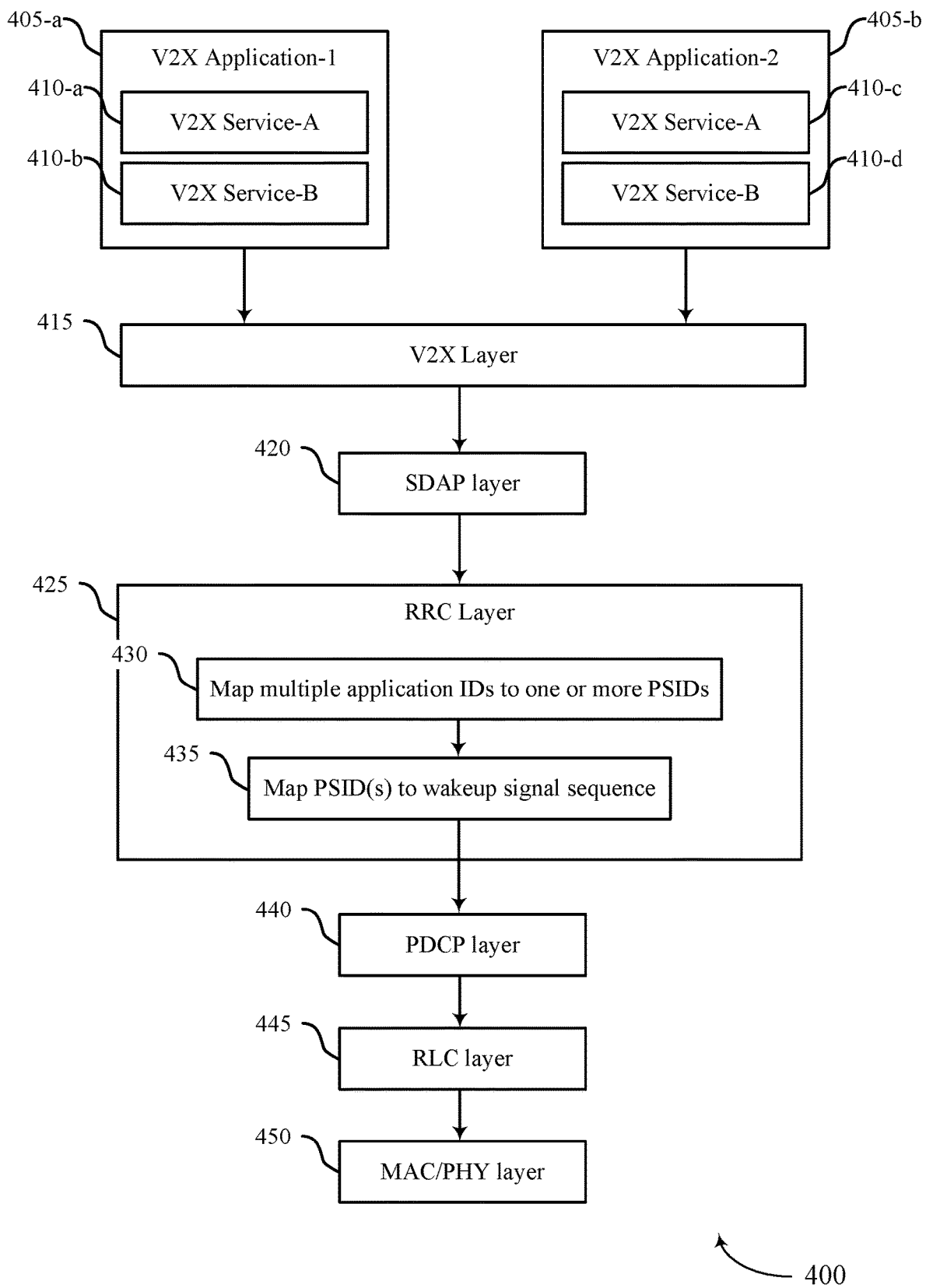

FIG. 4 illustrates an example of protocol stack layers 400 that support wakeup signaling identification in accordance with aspects of the present disclosure. The protocol stack layers 400 may implemented by a base station 105, or UEs 115, which may be examples of a base station 105 and UEs 115 as described with reference to FIGS. 1 and 2. UEs may include vehicle UEs, and pedestrian UEs. In some cases, a pedestrian UE may implement a wakeup determination procedure. For example, a pedestrian UE may determine whether to perform a wakeup signal based on an attribute of a received wakeup signal and preconfigured mapping between attributes and applications, where the mapping may be configured in the RRC layer. Additionally or alternatively, other wireless devices, such as a base station and vehicle UE, or some combination of these devices, may implement a wakeup determination procedure.

As described herein, a device, such as a vehicle UE or pedestrian UE, may be configured to support multiple applications. In some cases, applications may be specific to the communications between the pedestrian UE and vehicle UE, such as in a V2X, V2P, P2V, etc. supported networks. For example, a vehicle UE and pedestrian UE may be configured to support application-1 405-a and application-2 405-b. Application-1 405-a and application-2 405-b may each be applications relating to safety, or each application may be unrelated. Application-1 405-a, or application-2 405-b, or both may be applications of interest to a pedestrian UE 115 as described herein.

In some implementations, each application may be associated with one or more services. In some cases, each application may include various services 410 that support functionality of the applications, where a service 410 may be some function the application may perform. In some cases, a service 410 may be a category an application supports such as road safety, where more than one application may support a service 410. For example, application-1 405-a may be associated with V2X service-A 410-a and V2X service-B 410-b, and application-2 405-b may be associated with V2X service-A 410-c and V2X service-B 410-d, where the services 410 may be a function or a category supported by the application.

In some cases, each application may provide requirements associated with monitoring for paging messages to the V2X layer 415, to SDAP layer 420, and then to RRC layer 425. The RRC layer 425 may assign one or more identifiers (e.g., PSIDs, WUSIDs) based on the applications request to monitor for sidelink paging messages. The identifiers may be mapped to a sidelink wakeup sequence using one of the methods described with reference to FIG. 2. Alternately, the RRC layer 425 may use one or more identifiers (e.g., PSIDs, WUSIDs) assigned by other layers (e.g., application layer, SDAP layer, or V2X layer) to map the one or more identifiers to a sidelink wakeup sequence using one of the methods described herein. For example, within the RRC layer 425, each application ID may be mapped to a PSID or WUSID at 430, or multiple application IDs may be mapped to a single PSID or WUSID. Additionally or alternatively, the application IDs may be mapped to a PSID or WUSID in the V2X layer 415, and the configured PSIDs or WUSIDs may be relayed to RRC layer 425. The PSIDs or WUSIDs may then be mapped to a wakeup signal sequence at 435. The mapping configured in the RRC layer 425 may be communicated to lower layers such as PDCP layer 440, RLC layer 445, and MAC/PHY layer 450. As such, each layer in the protocol stack layers 400 may support the mapping configured in RRC layer 425. In some cases, a base station may transmit an RRC configuration message to the vehicle UE, or pedestrian UE, or both to indicate a mapping configuration or option used to map the wakeup signaling attributes to the application identifiers. For example, the RRC configuration message may indicate whether the application identifiers are mapped to different cyclic shifts of a single SWUS sequence, whether the application identifiers are mapped to multiple SWUS sequences (e.g., SL-SWUS-MappingInfo: {Options} INTEGER (1, 2, . . . )).

Figure 5:
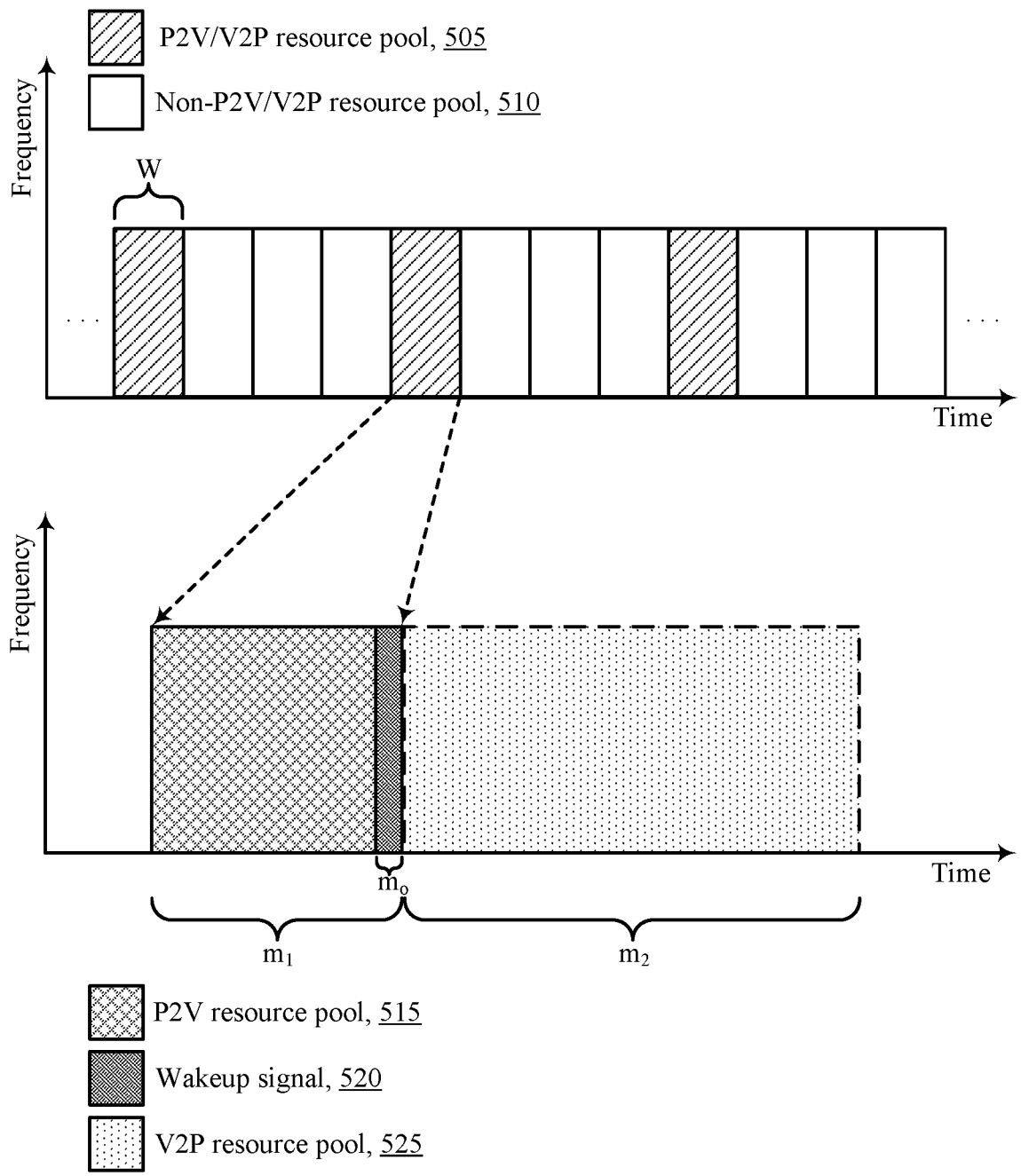
FIG. 5 illustrates an example of a resource configuration that supports wakeup signaling identification in accordance with aspects of the present disclosure.

FIG. 5 illustrates an example of a resource configuration 500 that supports wakeup signaling identification in accordance with aspects of the present disclosure. The resource configuration 500 may be implemented by vehicle UEs and pedestrian UEs which may be examples UEs 115 as described with reference to FIGS. 1 through 4. In some cases, a pedestrian UE 115 may determine a monitoring duration in resource configuration 500 based on a wakeup signal. For example, pedestrian UE 115-c may determine a monitoring duration for monitoring signals associated with a wakeup signal based on a mapping between wakeup signal attributes and monitoring durations. Additionally or alternatively, other wireless devices, such as base stations and vehicle UEs, or some combination of these devices, may implement a monitoring determination procedure.

In some examples, a wakeup signal (e.g., SWUS) received by a pedestrian UE from a vehicle UE may indicate a monitoring duration (e.g., an ON duration) for the pedestrian UE to monitor signals from a vehicle UE associated with the wakeup signal. As such, resources may be configured to support such monitoring duration. In some wireless communications systems, such as V2P, or P2V, a resource pool may be allocated to vehicle and pedestrian UEs for communications between the vehicle and pedestrian UEs. For example, vehicle and pedestrian UEs may be allocated P2V/V2P resource pools 505. As such, vehicle and pedestrian UEs may communicate during resource pools 505, and may not communicate during non-P2V/V2P resource pools, 510. In some cases, the number of slots included in the P2V/V2P resource pool 505 may be indicated by W. As depicted in FIG. 5, W is equal to one slot, but W may be any number of slots. Additionally or alternatively, W may refer to a duration of time, or any notation of time (e.g., symbols, subframes). The periodicity of P2V/V2P resource allocation may be equal to T slots or subframes. For example, P2V/V2P resource allocation may occur once every T slots.

The P2V/V2P resource pools 505 may include a P2V specific resource pool that may be allocated for a pedestrian UE to transmit to a vehicle UE. In some cases, multiple pedestrian UEs may transmit to one or more vehicle UEs during the P2V resource pool 515. The P2V/V2P resource pools 505 may also include a wakeup signal 520 (e.g., SWUS). The wakeup signal 520 may be referred to as a paging indicator resource that a vehicle UE may use to indicate to a pedestrian UE whether there is a page for the pedestrian UE. If there is a page for the pedestrian UE, then a monitoring duration (e.g., an ON duration) may be configured for V2P, such as V2P resource pool 525. V2P resource pool 525 may be used by a vehicle UE and a pedestrian UE such that a vehicle UE may transmit signals to the pedestrian UE during the resource pool, and the pedestrian UE may monitor for signals from the vehicle UE during the V2P resource pool 525. The V2P resource pool 525 may be a non-dedicated pool that is only allocated when there is a wakeup signal of interest received by the pedestrian UE. In some implementations, the P2V resource pool 515 may be allocated a duration $m_1$, the wakeup signal 520 may be allocated a duration $m_o$, and the V2P resource pool 525 may be allocated a duration $m_2$. In some cases, $m_1$ may indicate a duration of time, or a number of slots, symbols subframes, etc. of $f_1$ subchannels, channels, PRBs, etc. In some cases, $m_o$ may indicate a duration of time, or a number of slots, subframes, symbols, etc. that may span $f_o$ PRBs in a slot. In some cases, $m_2$ may indicate a duration of time, or a number of slots, subframes, symbols, etc. of $f_2$ subchannels, channels, PRBs, etc. As such, the configuration parameters for V2P/P2V communications may include T, W, $m_1$, $m_o$, $m_2$, $f_1$, $f_o$, and $f_2$.

In some cases, each wakeup signal may be configured with a different $m_2$. To indicate the duration of $m_2$ to a pedestrian UE the duration of $m_2$ may be mapped to a SWUS sequence or cyclic shift of the SWUS sequence. In some implementations, a number, K, of monitoring durations (e.g., V2P resource pools 525) may be preconfigured and a number, N, of SWUS sequence may be preconfigured. In some cases, one-to-one mapping may be used to map each SWUS sequence to each monitoring duration, where K=N. In some implementations, one-to-many mapping may be used to map the SWUS sequences to monitoring durations, where K≤N. In an example, SWUS sequence, {$S_1$, $S_2$} may denote a monitoring duration a first duration of $m_2$, such as $m_2$=100 slots, while a SWUS sequence {$S_3$} may denote a second duration of $m_2$, such as $m_2$=50 slots. In another example, a pedestrian UE may receive a SWUS sequence (e.g., {$S_i$}, i∈N) during $m_o$ and may determine the duration of $m_2$ to enter an ON state and monitor and decode messages from the vehicle UE.

Figure 6:
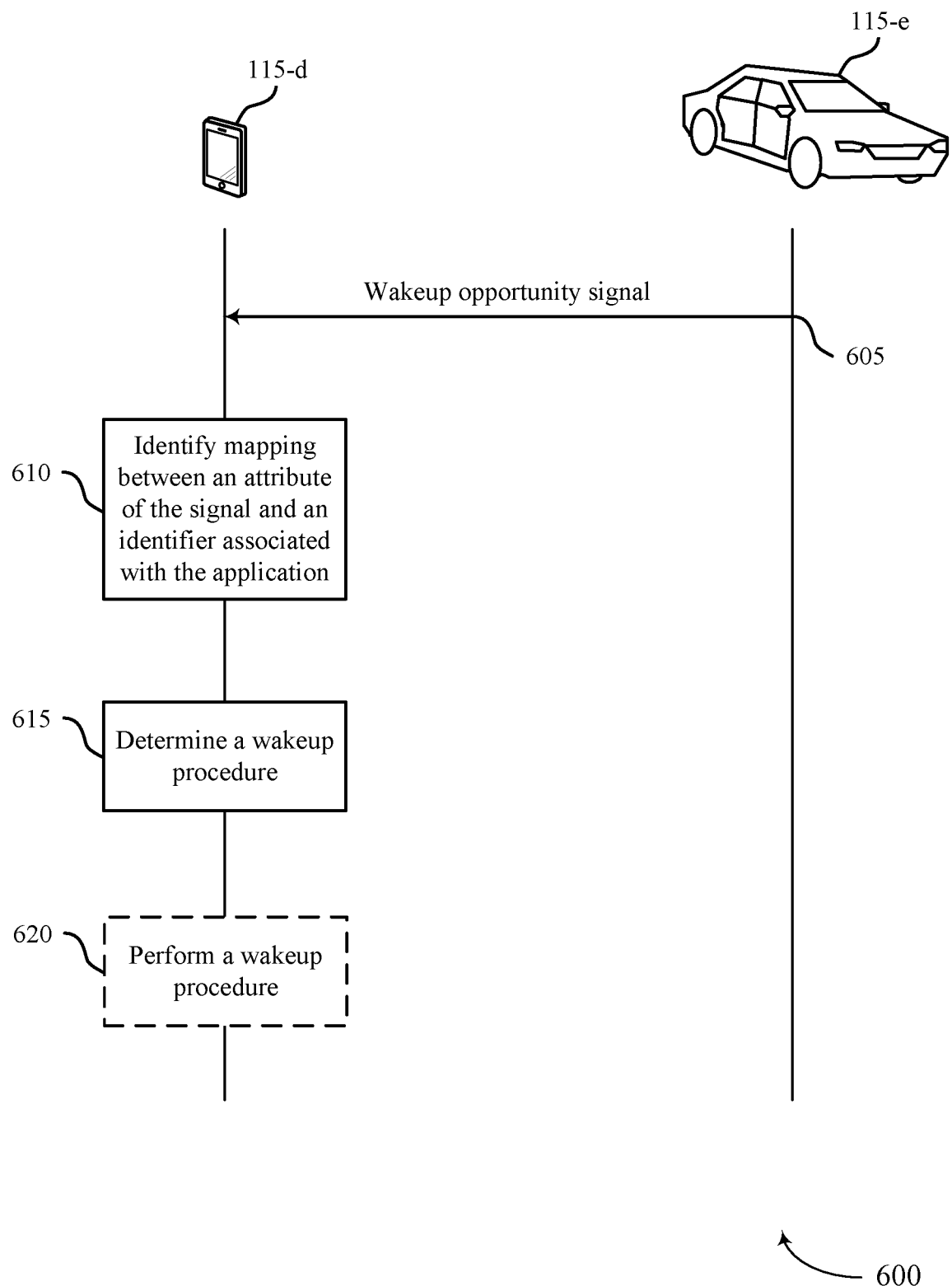
FIGS. 6 and 7 illustrate examples of process flows that support wakeup signaling identification in accordance with aspects of the present disclosure.

FIG. 6 illustrates an example of a process flow 600 that supports wakeup signaling identification in accordance with aspects of the present disclosure. The process flow 600 may illustrate an example wakeup determination procedure. For example, pedestrian UE 115-d may determine whether to perform a wakeup procedure for a wakeup signal transmitted by vehicle UE 115-e. Pedestrian UE 115-d and vehicle UE 115-e may be examples of the corresponding wireless devices described with reference to FIGS. 1 through 5. Although the example process flow 600 is illustrated in the context of a pedestrian UE 115-d and a vehicle UE 115-e in the context of vehicle to pedestrian system, it should be understood that the steps of process flow 600 may be performed by any UE 115 or network device. In some cases, instead of pedestrian UE 115-a performing the wakeup determination procedure, vehicle UE 115-e may perform the wakeup signal determination procedure. Alternative examples of the following may be implemented, where some steps are performed in a different order than described or are not performed at all. In some cases, steps may include additional features not mentioned below, or further steps may be added.

At 605, vehicle UE 115-e may transmit, to pedestrian UE 115-d, a signal (e.g., a SWUS or some other wakeup or paging signaling) indicating a wakeup opportunity associated with receiving one or more messages from an application. In some cases, the signal may be a wakeup signal that may be associated with an application (e.g., a safety application, GPS application, emergency application). In some instances, pedestrian UE 115-d may be determine applications that are of interest to the pedestrian UE 115-a (e.g., safety applications).

At 610, pedestrian UE 115-d may identify a mapping between an attribute of the signal and an identifier associated with the application. In some cases, the attribute of the signal may be a sequence (e.g., a sequence identifier, sequence index, etc.), where the signal sequence may map to (or otherwise indicate) a specific application or multiple applications. In some cases, the attribute of the signal may be a cyclic shift of a single sequence, where the cyclic shift applied to the received signal may map to (or otherwise indicate) a specific application or to multiple applications. The pedestrian UE 115-d may receive the signal, determine the attribute of the received signal, and determine the application the attribute maps to or indicates. In some cases, the attribute may map to an application of interest to pedestrian UE 115-d.

At 615, pedestrian UE 115-d may determine a wakeup procedure in response to receiving the signal based on the mapping. In some cases, determining a wakeup procedure may include determining to perform a wakeup procedure if the attribute of the signal mapped to an application of interest to pedestrian UE 115-d. In some cases, determining a wakeup procedure may include determining to skip an opportunity for waking up and may include remaining an idle, low power, sleep, or similar power state based on a determination that the application indicated by the wakeup signal is not an application of interest to the pedestrian UE 115-d.

In some cases, at 620, pedestrian UE 115-d may perform a wakeup procedure (e.g., turn on circuitry such as antennas or receive chains). In some cases, pedestrian UE 115-d may identifying a monitoring duration configured for monitoring one or more messages based on a mapping between the attribute of the signal and a set of monitoring durations. In some cases, the monitoring duration may be an ON duration. For example, UE 115-d may identifying a monitoring duration indicated by the signal that is associated with an application of interest to pedestrian UE 115-d. In some cases, the monitoring duration may be preconfigured and associated with a specific wakeup signal, or application, or both. Pedestrian UE 115-d may wakeup for the monitoring duration to monitor for one or more messages. In some cases, the monitoring duration may include a number of slots, symbols, subframes, etc.

Figure 7:
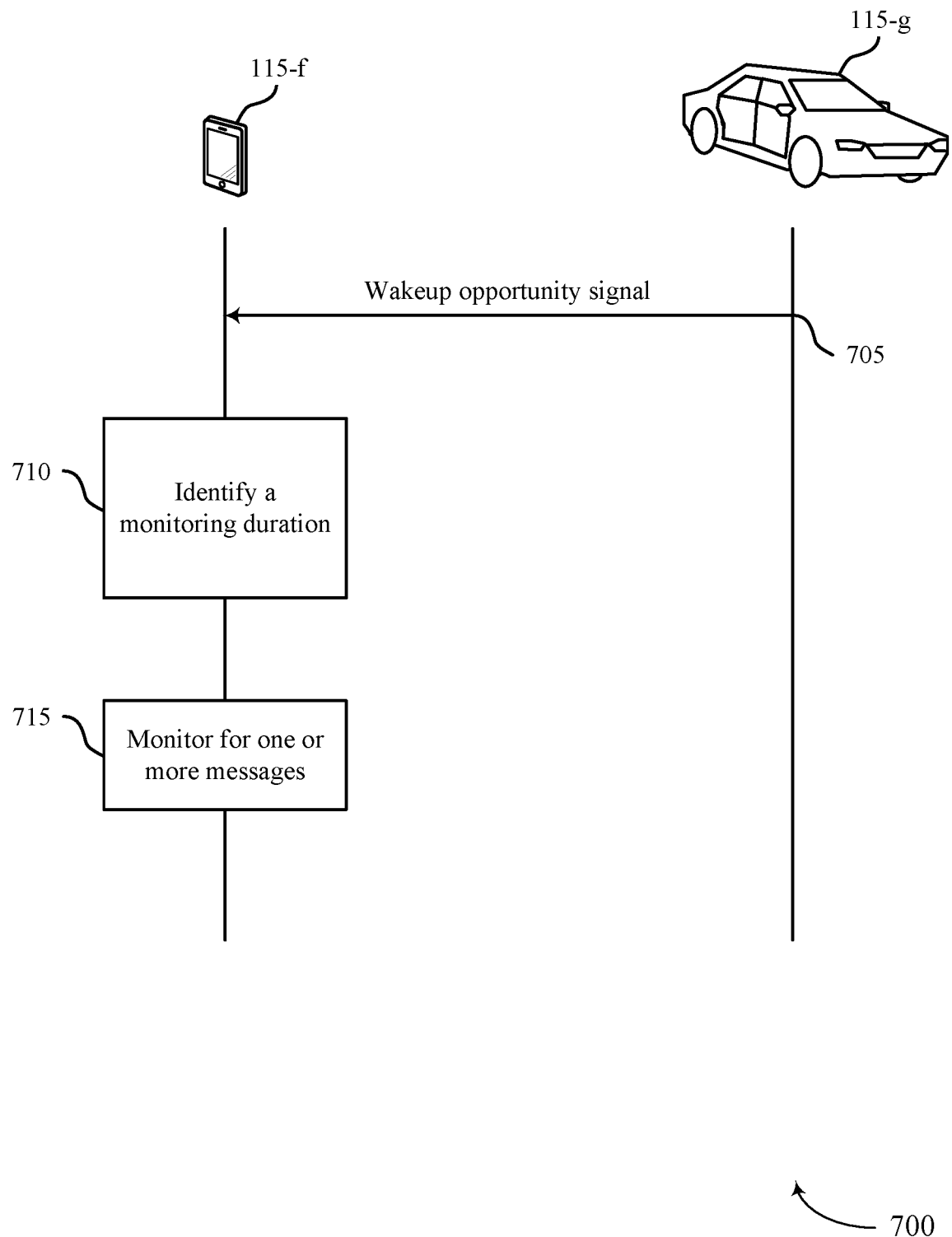

FIG. 7 illustrates an example of a process flow 700 that supports wakeup signaling identification in accordance with aspects of the present disclosure. The process flow 700 may illustrate an example wakeup monitoring procedure. For example, pedestrian UE 115-f may determine to monitor for signals based on a wakeup signal transmitted by vehicle UE 115-g. Pedestrian UE 115-f and vehicle UE 115-g may be examples of the corresponding wireless devices described with reference to FIGS. 1 through 6. In some cases, instead of pedestrian UE 115-a performing the wakeup monitoring procedure, vehicle UE 115-f may perform the wakeup monitoring procedure. Alternative examples of the following may be implemented, where some steps are performed in a different order than described or are not performed at all. In some cases, steps may include additional features not mentioned below, or further steps may be added.

At 705, vehicle UE 115-g may transmit, to pedestrian UE 115-f, a signal (e.g., a SWUS) indicating a wakeup opportunity associated with receiving one or more messages from an application.

At 710, pedestrian UE 115-f may identify a monitoring duration for monitoring for the one or more messages based on a mapping between an attribute (e.g., sequence, cyclic shift) of the signal and a set of monitoring durations. For example, the attribute of the received signal may be mapped to an application and may be mapped to a monitoring duration. In some implementations, the mapping between the attribute of the signal and the set of monitoring durations includes a one-to-one mapping between sequences of the signal and the set of monitoring durations. In some implementations, the mapping between the attribute of the signal and the set of monitoring durations includes a one-to-many mapping between sequences of the signal and the set of monitoring durations. In some cases, the pedestrian UE 115-f may receive a signal that maps to an application of interest to the pedestrian UE 115-f. The pedestrian UE 115-f may determine the monitoring duration based on the mapping.

At 715, pedestrian UE 115-f may monitor for the one or more messages based on the monitoring duration. In some cases, the monitoring duration may be a number of slots, symbols, subframes, etc.

Figure 8:
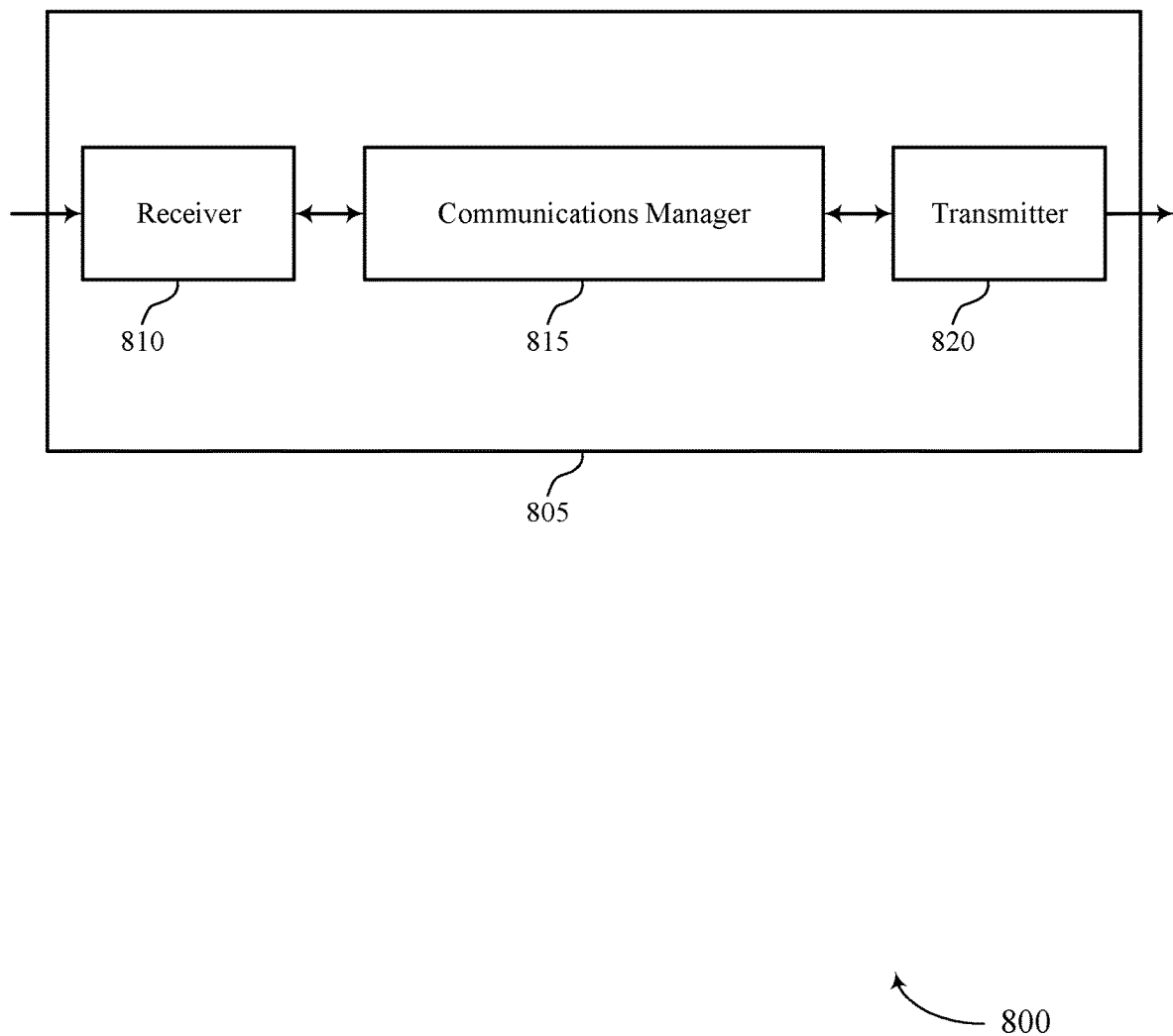
FIGS. 8 and 9 show block diagrams of devices that support wakeup signaling identification in accordance with aspects of the present disclosure.

FIG. 8 shows a block diagram 800 of a device 805 that supports wakeup signaling identification in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to wakeup signaling identification, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a signal indicating a wakeup opportunity associated with receiving one or more messages from an application, identify a mapping between an attribute of the signal and an identifier associated with the application, and determine a wakeup procedure in response to receiving the signal based on the mapping. The communications manager 815 may also receive a signal indicating a wakeup opportunity associated with receiving one or more messages from an application, identify a monitoring duration for monitoring for the one or more messages based on a mapping between an attribute of the signal and a set of monitoring durations, and monitor for the one or more messages based on the monitoring duration. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

The communications manager 815 as described herein may be implemented to realize one or more potential advantages. One implementation may allow the device 805 to more efficiently utilize resource and determine whether to wake up for a wakeup signal from a vehicle UE 115. For example, a device 805 may receive multiple wakeup signals from a vehicle UE 115 and the device may determine whether the wakeup signal is associated with an application of interest to the device 805 rather than wakeup for each received wakeup signal.

Based on implementing the wakeup procedure determination techniques as described herein, a processor of a UE 115 (e.g., controlling the receiver 810, the transmitter 820, or the transceiver 1120 as described with reference to FIG. 11) may increase efficiency and mitigate power consumption in wakeup signal procedure performed by the UE 115.

Figure 9:
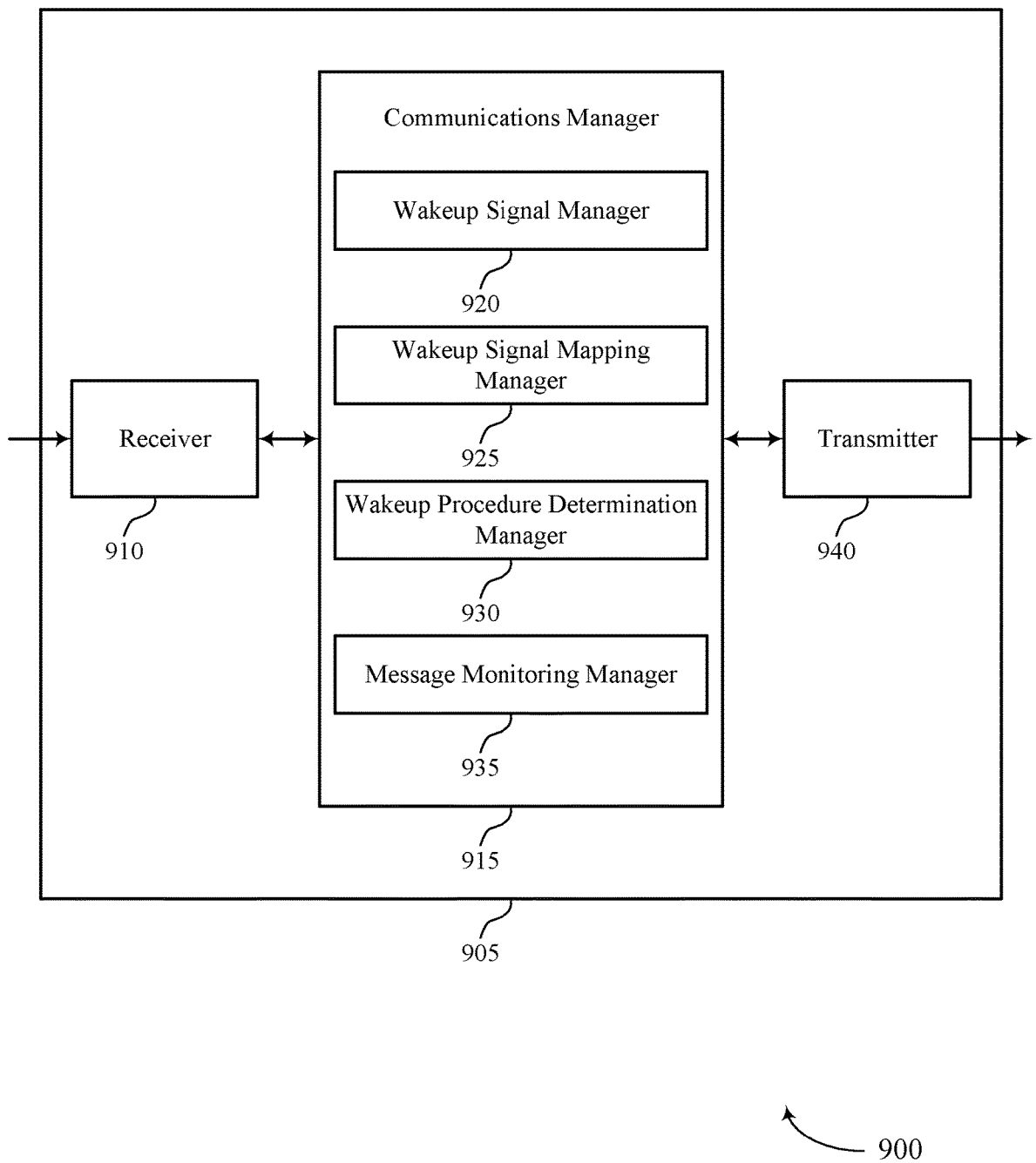

FIG. 9 shows a block diagram 900 of a device 905 that supports wakeup signaling identification in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to wakeup signaling identification, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a wakeup signal manager 920, a wakeup signal mapping manager 925, a wakeup procedure determination manager 930, and a message monitoring manager 935. The communications manager 915 may be an example of aspects of the communications manager 1110 described herein.

The wakeup signal manager 920 may receive a signal indicating a wakeup opportunity associated with receiving one or more messages from an application. The wakeup signal mapping manager 925 may identify a mapping between an attribute of the signal and an identifier associated with the application. The wakeup procedure determination manager 930 may determine a wakeup procedure in response to receiving the signal based on the mapping.

The wakeup signal manager 920 may receive a signal indicating a wakeup opportunity associated with receiving one or more messages from an application. The wakeup signal mapping manager 925 may identify a monitoring duration for monitoring for the one or more messages based on a mapping between an attribute of the signal and a set of monitoring durations. The message monitoring manager 935 may monitor for the one or more messages based on the monitoring duration.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
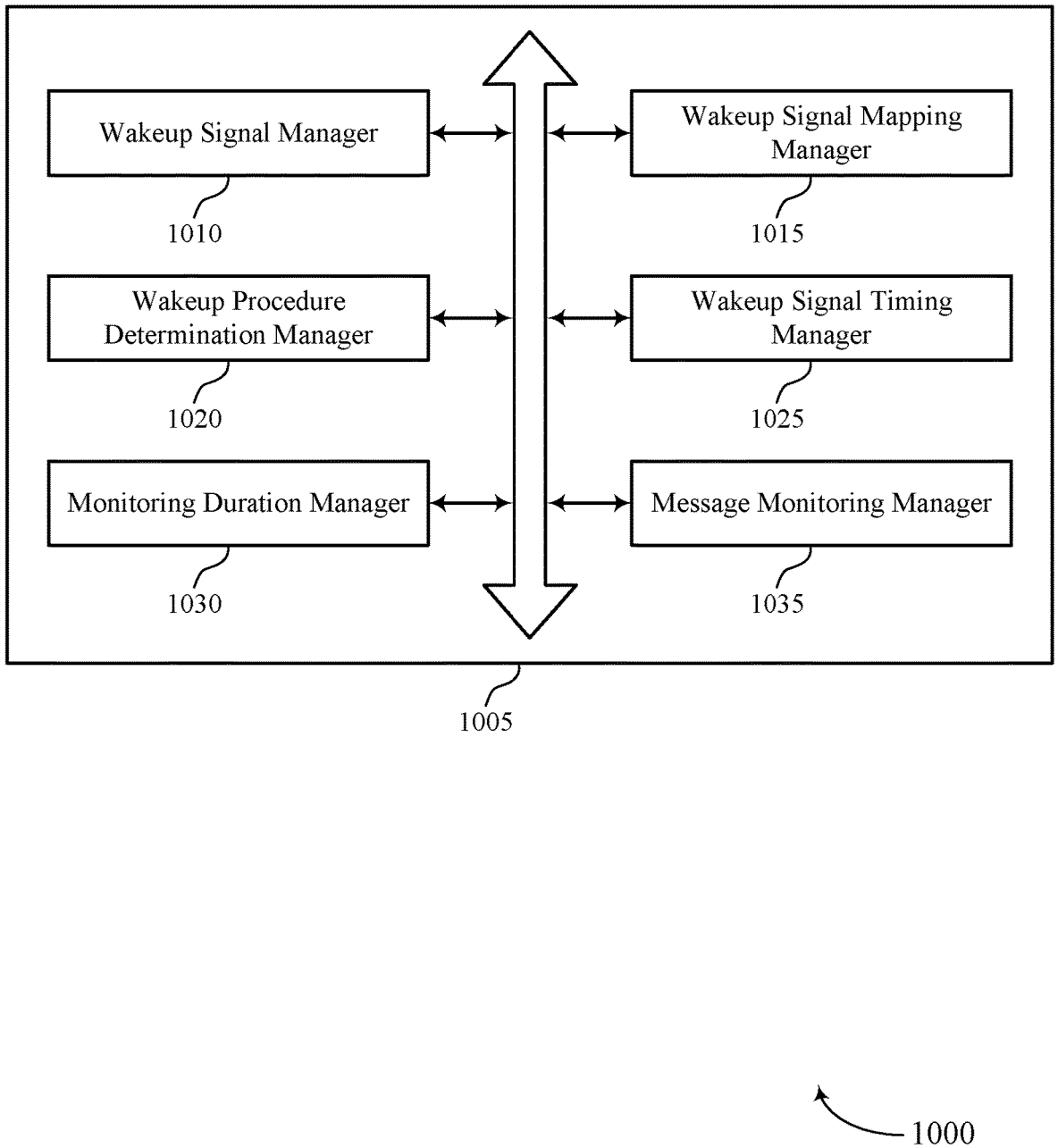
FIG. 10 shows a block diagram of a communications manager that supports wakeup signaling identification in accordance with aspects of the present disclosure.

FIG. 10 shows a block diagram 1000 of a communications manager 1005 that supports wakeup signaling identification in accordance with aspects of the present disclosure. The communications manager 1005 may be an example of aspects of a communications manager 815, a communications manager 915, or a communications manager 1110 described herein. The communications manager 1005 may include a wakeup signal manager 1010, a wakeup signal mapping manager 1015, a wakeup procedure determination manager 1020, a wakeup signal timing manager 1025, a monitoring duration manager 1030, and a message monitoring manager 1035. Each of these modules may communicate, directly or indirectly, with one another (e.g., via one or more buses).

The wakeup signal manager 1010 may receive a signal indicating a wakeup opportunity associated with receiving one or more messages from an application. The wakeup signal mapping manager 1015 may identify a mapping between an attribute of the signal and an identifier associated with the application. The wakeup procedure determination manager 1020 may determine a wakeup procedure in response to receiving the signal based on the mapping.

The wakeup signal timing manager 1025 may determine a reference time period associated with receiving the signal and a periodicity associated with receiving the signal based on the attribute of the signal.

In some examples, the wakeup signal manager 1010 may receive a signal indicating a wakeup opportunity associated with receiving one or more messages from an application. In some examples, the wakeup signal manager 1010 may receive configuration signaling indicating the attribute of the signal used for the mapping. In some cases, the attribute of the signal includes a sequence. In some cases, the attribute of the signal includes a cyclic shift. In some cases, the signal includes a SWUS.

In some cases, the mapping includes a mapping between a set of sequences and a set of identifiers associated with a set of applications. In some cases, the mapping is based on a modulo function of a number of the set of sequences and an identifier of the set of identifiers associated with the set of applications.

In some cases, the mapping includes a mapping between a set of cyclic shifts of a single sequence and a set of identifiers associated with a set of applications. In some cases, the mapping is based on a modulo function of a number of the set of cyclic shifts of the single sequence and an identifier of the set of identifiers associated with the set of applications.

In some cases, the mapping is based on a mapping at a vehicle to everything protocol stack layer. In some cases, the mapping is based on a mapping at an RRC protocol stack layer. In some cases, the identifier associated with the application includes a PSID that is mapped to one or more application specific identifiers. In some cases, the PSID is mapped to an application identifier of the application.

The monitoring duration manager 1030 may identify a monitoring duration configured for monitoring for the one or more messages based on a mapping between the attribute of the signal and a set of monitoring durations. In some cases, the monitoring duration includes a number of slots.

In some cases, the wakeup procedure includes turning on circuitry for monitoring for the one or more messages. In some cases, the wakeup procedure includes skipping the wakeup opportunity.

The wakeup signal manager 1010 may receive a signal indicating a wakeup opportunity associated with receiving one or more messages from an application. In some examples, the wakeup signal mapping manager 1015 may identify a monitoring duration for monitoring for the one or more messages based on a mapping between an attribute of the signal and a set of monitoring durations. The message monitoring manager 1035 may monitor for the one or more messages based on the monitoring duration.

In some cases, the monitoring duration includes a number of slots. In some cases, the mapping between the attribute of the signal and the set of monitoring durations includes a one-to-one mapping between sequences of the signal and the set of monitoring durations. In some cases, the mapping between the attribute of the signal and the set of monitoring durations includes a one-to-many mapping between sequences of the signal and the set of monitoring durations.

Figure 11:
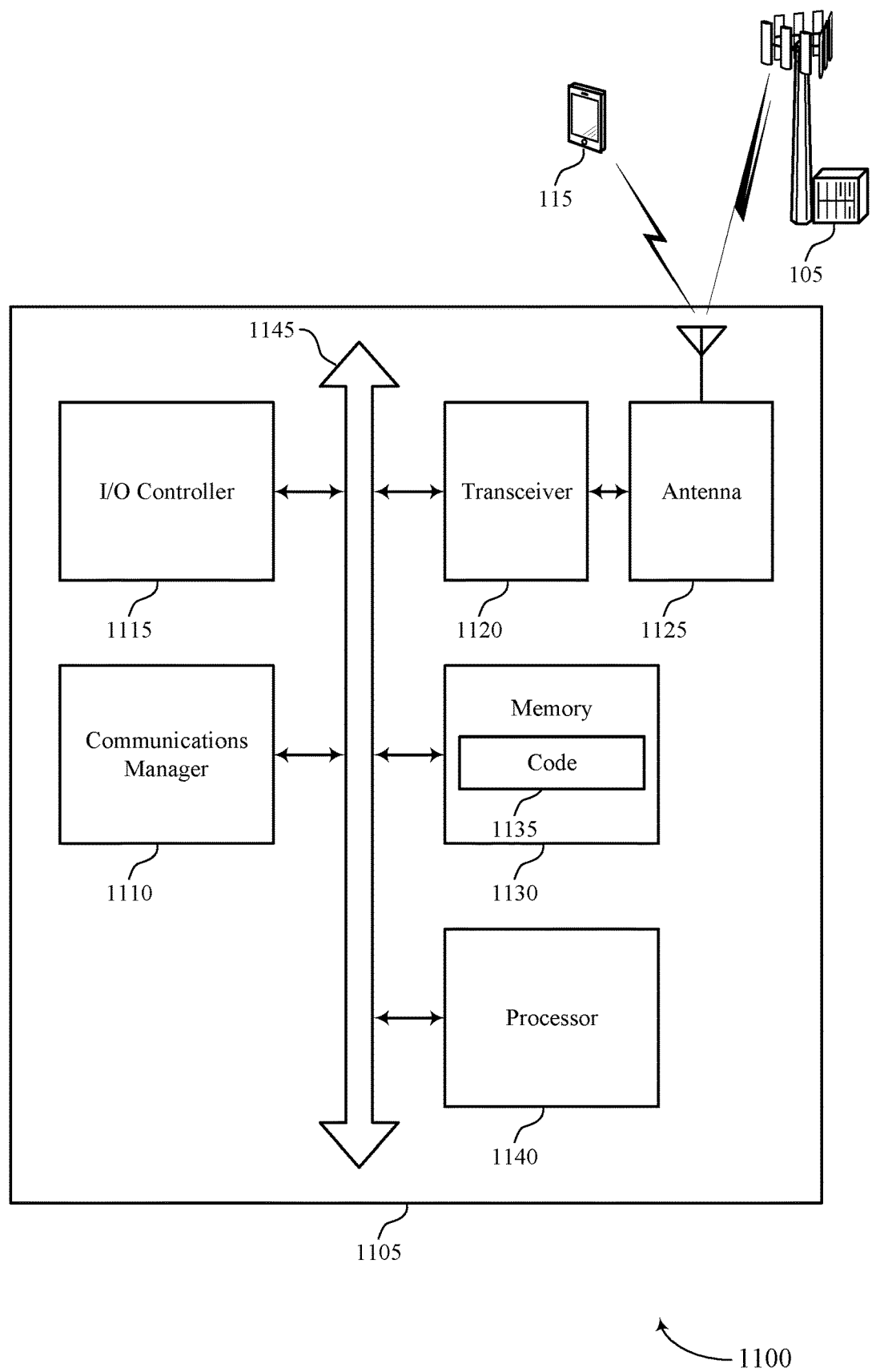
FIG. 11 shows a diagram of a system including a device that supports wakeup signaling identification in accordance with aspects of the present disclosure.

FIG. 11 shows a diagram of a system 1100 including a device 1105 that supports wakeup signaling identification in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a signal indicating a wakeup opportunity associated with receiving one or more messages from an application, identify a mapping between an attribute of the signal and an identifier associated with the application, and determine a wakeup procedure in response to receiving the signal based on the mapping. The communications manager 1110 may also receive a signal indicating a wakeup opportunity associated with receiving one or more messages from an application, identify a monitoring duration for monitoring for the one or more messages based on a mapping between an attribute of the signal and a set of monitoring durations, and monitor for the one or more messages based on the monitoring duration.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting wakeup signaling identification).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
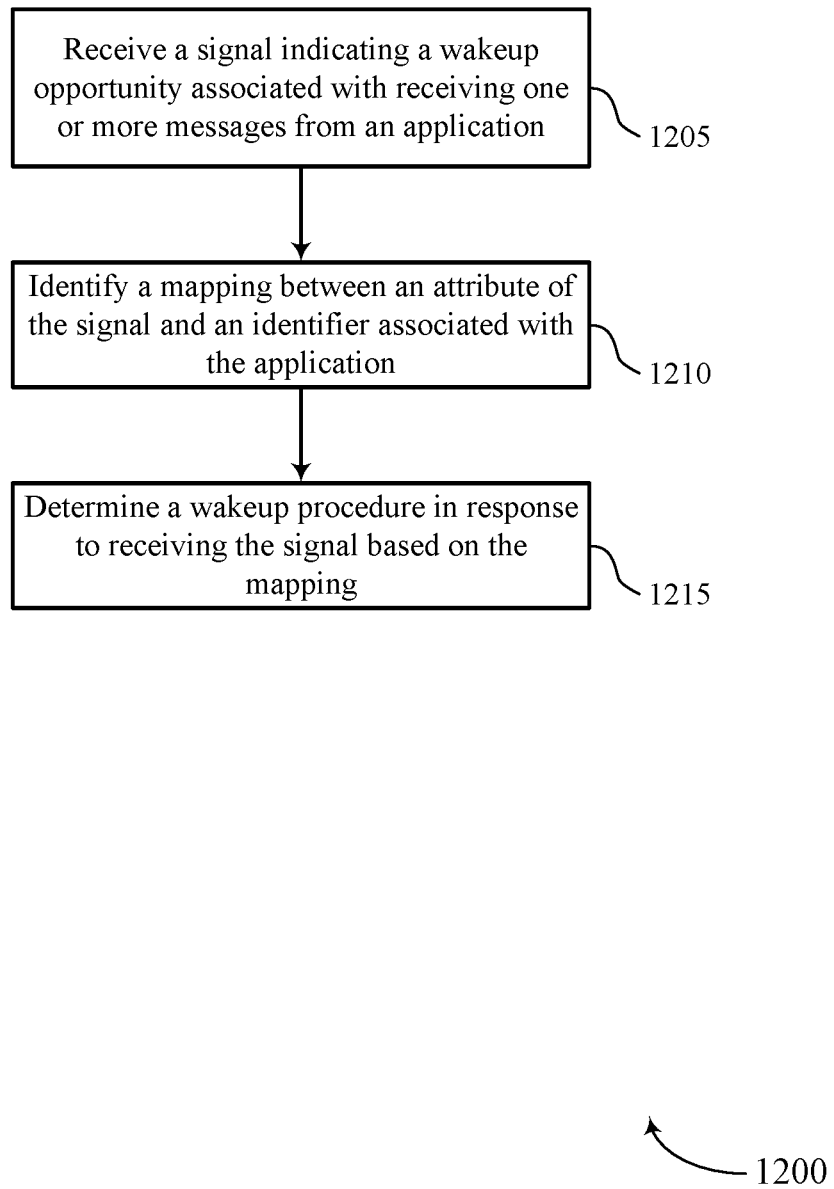
FIGS. 12 through 14 show flowcharts illustrating methods that support wakeup signaling identification in accordance with aspects of the present disclosure.

FIG. 12 shows a flowchart illustrating a method 1200 that supports wakeup signaling identification in accordance with aspects of the present disclosure. The operations of method 1200 may be implemented by a UE 115 or its components as described herein. For example, the operations of method 1200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1205, the UE may receive a signal indicating a wakeup opportunity associated with receiving one or more messages from an application. The operations of 1205 may be performed according to the methods described herein. In some examples, aspects of the operations of 1205 may be performed by a wakeup signal manager as described with reference to FIGS. 8 through 11.

At 1210, the UE may identify a mapping between an attribute of the signal and an identifier associated with the application. The operations of 1210 may be performed according to the methods described herein. In some examples, aspects of the operations of 1210 may be performed by a wakeup signal mapping manager as described with reference to FIGS. 8 through 11.

At 1215, the UE may determine a wakeup procedure in response to receiving the signal based on the mapping. The operations of 1215 may be performed according to the methods described herein. In some examples, aspects of the operations of 1215 may be performed by a wakeup procedure determination manager as described with reference to FIGS. 8 through 11.

Figure 13:
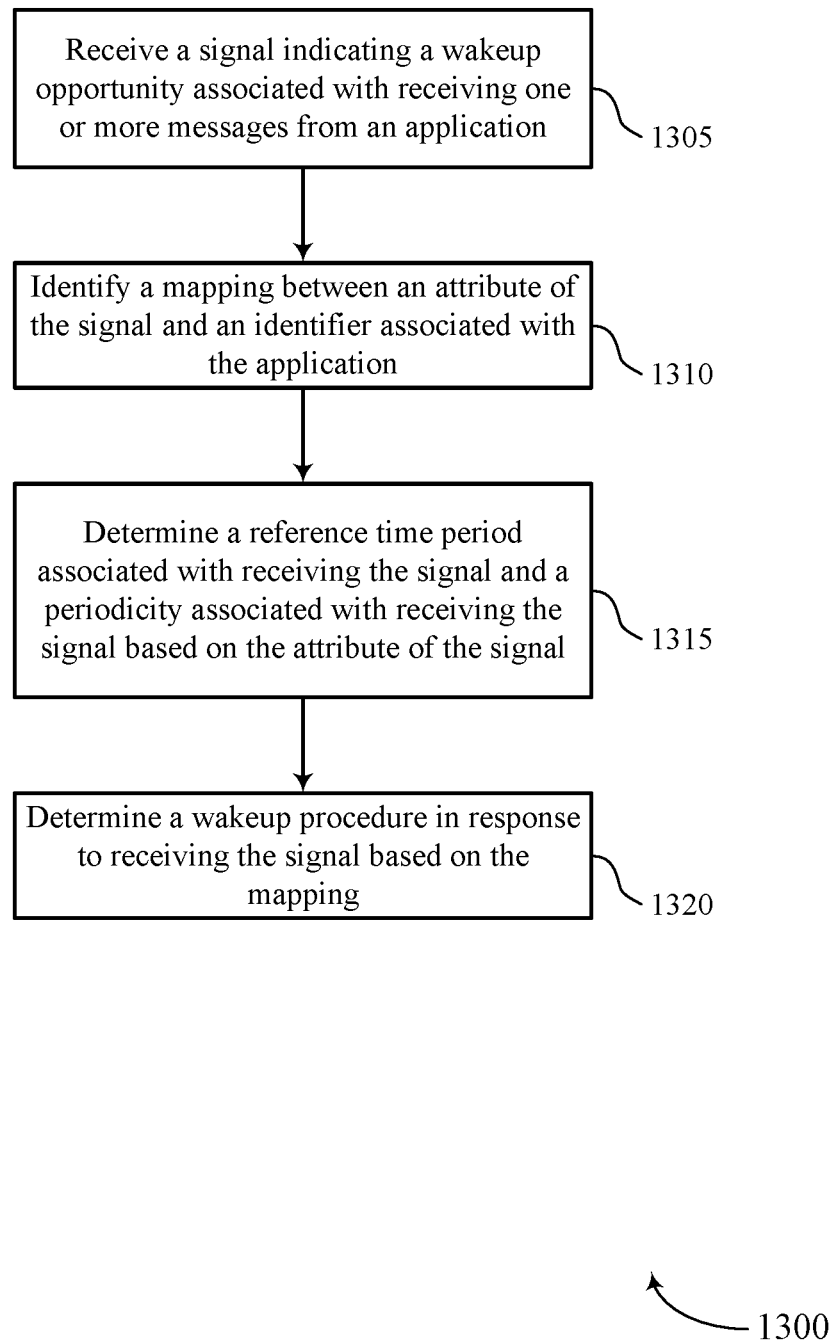

FIG. 13 shows a flowchart illustrating a method 1300 that supports wakeup signaling identification in accordance with aspects of the present disclosure. The operations of method 1300 may be implemented by a UE 115 or its components as described herein. For example, the operations of method 1300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1305, the UE may receive a signal indicating a wakeup opportunity associated with receiving one or more messages from an application. The operations of 1305 may be performed according to the methods described herein. In some examples, aspects of the operations of 1305 may be performed by a wakeup signal manager as described with reference to FIGS. 8 through 11.

At 1310, the UE may identify a mapping between an attribute of the signal and an identifier associated with the application. The operations of 1310 may be performed according to the methods described herein. In some examples, aspects of the operations of 1310 may be performed by a wakeup signal mapping manager as described with reference to FIGS. 8 through 11.

At 1315, the UE may determine a reference time period associated with receiving the signal and a periodicity associated with receiving the signal based on the attribute of the signal. The operations of 1315 may be performed according to the methods described herein. In some examples, aspects of the operations of 1315 may be performed by a wakeup signal timing manager as described with reference to FIGS. 8 through 11.

At 1320, the UE may determine a wakeup procedure in response to receiving the signal based on the mapping. The operations of 1320 may be performed according to the methods described herein. In some examples, aspects of the operations of 1320 may be performed by a wakeup procedure determination manager as described with reference to FIGS. 8 through 11.

Figure 14:
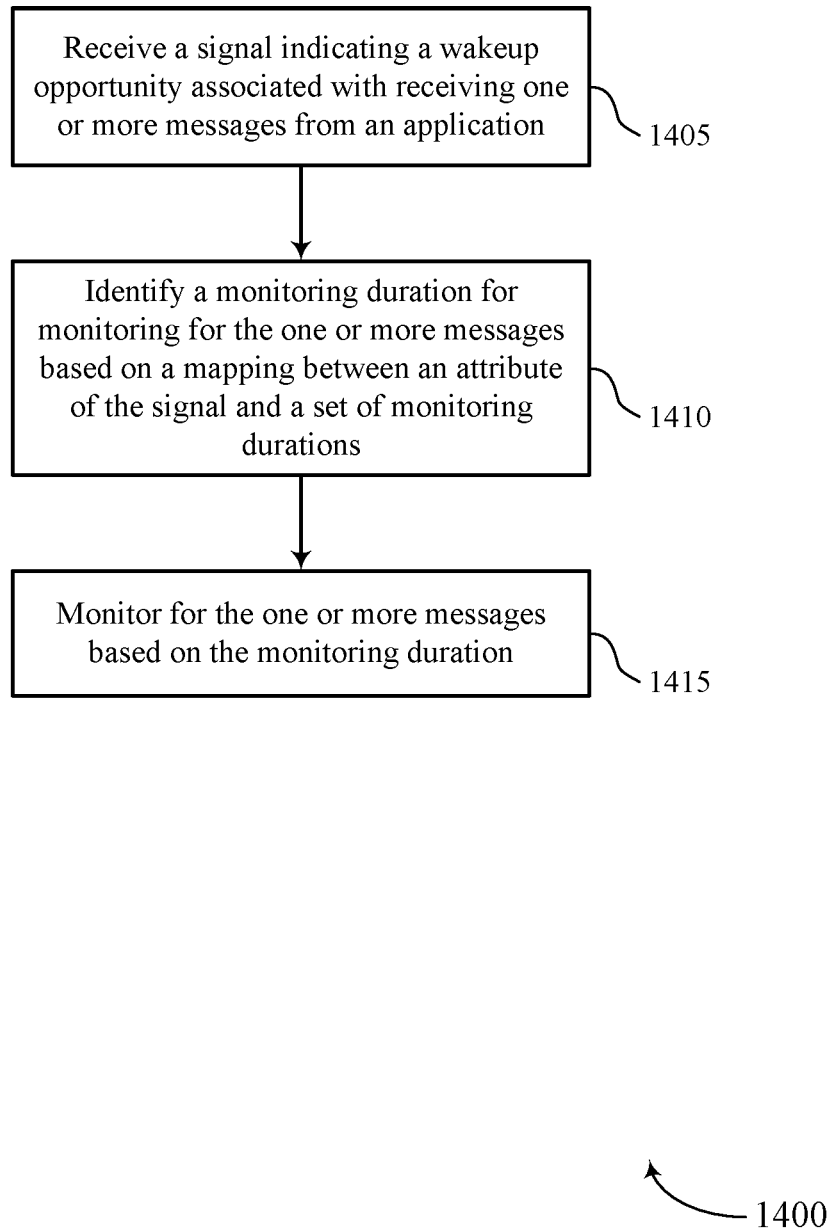

FIG. 14 shows a flowchart illustrating a method 1400 that supports wakeup signaling identification in accordance with aspects of the present disclosure. The operations of method 1400 may be implemented by a UE 115 or its components as described herein. For example, the operations of method 1400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1405, the UE may receive a signal indicating a wakeup opportunity associated with receiving one or more messages from an application. The operations of 1405 may be performed according to the methods described herein. In some examples, aspects of the operations of 1405 may be performed by a wakeup signal manager as described with reference to FIGS. 8 through 11.

At 1410, the UE may identify a monitoring duration for monitoring for the one or more messages based on a mapping between an attribute of the signal and a set of monitoring durations. The operations of 1410 may be performed according to the methods described herein. In some examples, aspects of the operations of 1410 may be performed by a wakeup signal mapping manager as described with reference to FIGS. 8 through 11.

At 1415, the UE may monitor for the one or more messages based on the monitoring duration. The operations of 1415 may be performed according to the methods described herein. In some examples, aspects of the operations of 1415 may be performed by a message monitoring manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a signal indicating a wakeup opportunity associated with receiving one or more messages from an application; identifying a mapping between an attribute of the signal and an identifier associated with the application; and determining a wakeup procedure in response to receiving the signal based at least in part on the mapping.

Aspect 2: The method of aspect 1, further comprising: determining a reference time period associated with receiving the signal and a periodicity associated with receiving the signal based at least in part on the attribute of the signal.

Aspect 3: The method of any of aspects 1 through 2, wherein the attribute of the signal comprises a sequence.

Aspect 4: The method of aspect 3, wherein the mapping comprises a mapping between a plurality of sequences and a plurality of identifiers associated with a plurality of applications.

Aspect 5: The method of aspect 4, wherein the mapping is based at least in part on a modulo function of a number of the plurality of sequences and an identifier of the plurality of identifiers associated with the plurality of applications.

Aspect 6: The method of any of aspects 1 through 5, wherein the attribute of the signal comprises a cyclic shift.

Aspect 7: The method of aspect 6, wherein the mapping comprises a mapping between a plurality of cyclic shifts of a single sequence and a plurality of identifiers associated with a plurality of applications.

Aspect 8: The method of aspect 7, wherein the mapping is based at least in part on a modulo function of a number of the plurality of cyclic shifts of the single sequence and an identifier of the plurality of identifiers associated with the plurality of applications.

Aspect 9: The method of any of aspects 1 through 8, further comprising: receiving configuration signaling indicating the attribute of the signal used for the mapping.

Aspect 10: The method of any of aspects 1 through 9, wherein the mapping is based at least in part on a mapping at a vehicle to everything protocol stack layer.

Aspect 11: The method of any of aspects 1 through 10, wherein the mapping is based at least in part on a mapping at a radio resource control protocol stack layer.

Aspect 12: The method of any of aspects 1 through 11, wherein the signal comprises a sidelink wakeup signal.

Aspect 13: The method of any of aspects 1 through 12, wherein the identifier associated with the application comprises a provider service identifier that is mapped to one or more application specific identifiers.

Aspect 14: The method of aspect 13, wherein the provider service identifier is mapped to an application identifier of the application.

Aspect 15: The method of any of aspects 1 through 14, further comprising: identifying a monitoring duration configured for monitoring for the one or more messages based at least in part on a mapping between the attribute of the signal and a plurality of monitoring durations.

Aspect 16: The method of aspect 15, wherein the monitoring duration comprises a number of slots.

Aspect 17: The method of any of aspects 1 through 16, wherein the wakeup procedure comprises turning on circuitry for monitoring for the one or more messages.

Aspect 18: The method of any of aspects 1 through 17, wherein the wakeup procedure comprises skipping the wakeup opportunity.

Aspect 19: A method for wireless communications at a UE, comprising: receiving a signal indicating a wakeup opportunity associated with receiving one or more messages from an application; identifying a monitoring duration for monitoring for the one or more messages based at least in part on a mapping between an attribute of the signal and a plurality of monitoring durations; and monitoring for the one or more messages based at least in part on the monitoring duration.

Aspect 20: The method of aspect 19, wherein the monitoring duration comprises a number of slots.

Aspect 21: The method of any of aspects 19 through 20, wherein the mapping between the attribute of the signal and the plurality of monitoring durations comprises a one-to-one mapping between sequences of the signal and the plurality of monitoring durations.

Aspect 22: The method of any of aspects 19 through 21, wherein the mapping between the attribute of the signal and the plurality of monitoring durations comprises a one-to-many mapping between sequences of the signal and the plurality of monitoring durations.

Aspect 23: An apparatus for wireless communications at a UE, comprising a processor; memory coupled with the processor; and instructions stored in the memory and executable by the processor to cause the apparatus to perform a method of any of aspects 1 through 18.

Aspect 24: An apparatus for wireless communications at a UE, comprising at least one means for performing a method of any of aspects 1 through 18.

Aspect 25: A non-transitory computer-readable medium storing code for wireless communications at a UE, the code comprising instructions executable by a processor to perform a method of any of aspects 1 through 18.

Aspect 26: An apparatus for wireless communications at a UE, comprising a processor; memory coupled with the processor; and instructions stored in the memory and executable by the processor to cause the apparatus to perform a method of any of aspects 19 through 22.

Aspect 27: An apparatus for wireless communications at a UE, comprising at least one means for performing a method of any of aspects 19 through 22.

Aspect 28: A non-transitory computer-readable medium storing code for wireless communications at a UE, the code comprising instructions executable by a processor to perform a method of any of aspects 19 through 22.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a signal indicating a wakeup opportunity associated with receiving one or more messages from an application;
   performing a wakeup procedure in response to receiving the signal based at least in part on a mapping between an attribute of the signal and an identifier associated with the application, wherein the mapping is based at least in part on a modulo function of an attribute of the signal and an identifier associated with the application; and
   receiving the one or more messages from the application for the UE based at least in part on performing the wakeup procedure.

2. The method of claim 1, further comprising:
   determining both a reference time period associated with receiving the signal and a periodicity associated with receiving the signal based at least in part on the attribute of the signal.

3. The method of claim 1, wherein the attribute of the signal comprises a sequence.

4. The method of claim 3, wherein the mapping is between a plurality of sequences and a plurality of identifiers associated with a plurality of applications.

5. The method of claim 4, wherein the mapping is based at least in part on the modulo function of a number of the plurality of sequences and the identifier of the plurality of identifiers associated with the plurality of applications.

6. The method of claim 1, wherein the attribute of the signal comprises a cyclic shift.

7. The method of claim 6, wherein the mapping is a mapping between a plurality of cyclic shifts of a single sequence and a plurality of identifiers associated with a plurality of applications.

8. The method of claim 7, wherein the mapping is based at least in part on the modulo function of a number of the plurality of cyclic shifts of the single sequence and the identifier of the plurality of identifiers associated with the plurality of applications.

9. The method of claim 1, further comprising:
   receiving configuration signaling indicating the attribute of the signal used for the mapping.

10. The method of claim 1, wherein the mapping is based at least in part on a mapping at a vehicle to everything protocol stack layer.

11. The method of claim 1, wherein the mapping is based at least in part on a mapping at a radio resource control protocol stack layer.

12. The method of claim 1, wherein the signal comprises a sidelink wakeup signal.

13. The method of claim 1, wherein the identifier associated with the application comprises a provider service identifier that is mapped to one or more application specific identifiers.

14. The method of claim 13, wherein the provider service identifier is mapped to an application identifier of the application.

15. The method of claim 1, further comprising:
   identifying a monitoring duration configured for monitoring for the one or more messages based at least in part on a mapping between the attribute of the signal and a plurality of monitoring durations.

16. The method of claim 15, wherein the monitoring duration comprises a number of slots.

17. The method of claim 1, wherein performing the wakeup procedure comprises:
   turning on circuitry for monitoring for the one or more messages.

18. A method for wireless communications at a user equipment (UE), comprising:
   receiving a signal indicating a wakeup opportunity associated with receiving one or more sidelink messages from an application; and
   monitoring for the one or more sidelink messages based at least in part on a monitoring duration, wherein the monitoring duration is based at least in part on a mapping between an attribute of the signal and a plurality of monitoring durations.

19. The method of claim 18, wherein the monitoring duration comprises a number of slots.

20. The method of claim 18, wherein the mapping between the attribute of the signal and the plurality of monitoring durations is a one-to-one mapping between sequences of the signal and the plurality of monitoring durations.

21. The method of claim 18, wherein the mapping between the attribute of the signal and the plurality of monitoring durations is a one-to-many mapping between sequences of the signal and the plurality of monitoring durations.

22. An apparatus for wireless communications at a user equipment (UE), comprising:
a processor,
memory coupled with the processor; and
instructions stored in the memory and executable by the processor to cause the apparatus to:
receive a signal indicating a wakeup opportunity associated with receiving one or more messages from an application;
perform a wakeup procedure in response to receiving the signal based at least in part on a mapping between an attribute of the signal and an identifier associated with the application, wherein the mapping is based at least in part on a modulo function of an attribute of the signal and an identifier associated with the application; and
receive the one or more messages from the application for the UE based at least in part on performing the wakeup procedure.

23. The apparatus of claim 22, wherein the instructions are further executable by the processor to cause the apparatus to:

determine both a reference time period associated with receiving the signal and a periodicity associated with receiving the signal based at least in part on the attribute of the signal.

24. The apparatus of claim 22, wherein the attribute of the signal comprises a sequence.

25. The apparatus of claim 24, wherein the mapping is between a plurality of sequences and a plurality of identifiers associated with a plurality of applications.

26. The apparatus of claim 25, wherein the mapping is based at least in part on the modulo function of a number of the plurality of sequences and an identifier of the plurality of identifiers associated with the plurality of applications.

27. The apparatus of claim 22, wherein the attribute of the signal comprises a cyclic shift.

28. The apparatus of claim 27, wherein the mapping is between a plurality of cyclic shifts of a single sequence and a plurality of identifiers associated with a plurality of applications.

29. An apparatus for wireless communications at a user equipment (UE), comprising:
a processor,
memory coupled with the processor; and
instructions stored in the memory and executable by the processor to cause the apparatus to:
receive a signal indicating a wakeup opportunity associated with receiving one or more sidelink messages from an application;
and
monitor for the one or more sidelink messages based at least in part on a monitoring duration, wherein the monitoring duration is based at least in part on a mapping between an attribute of the signal and a plurality of monitoring durations.

* * * * *